United States Patent
Hiraki et al.

[11] Patent Number: 5,966,407
[45] Date of Patent: Oct. 12, 1999

[54] BUS DRIVING SYSTEM AND INTEGRATED CIRCUIT DEVICE USING THE SAME

[75] Inventors: Mitsuru Hiraki, Hachioji, Japan; Hirotsugu Kojima, Foster City, Calif.; Masaru Kokubo, Hanno, Japan; Takafumi Kikuchi, Kokubunji, Japan; Yuji Hatano, Kodaira, Japan; Kouki Noguchi, Kokubunji, Japan; Masao Hotta, Hanno, Japan

[73] Assignee: Hitachi, Ltd., Tokyo, Japan

[21] Appl. No.: 08/251,185

[22] Filed: May 31, 1994

[30] Foreign Application Priority Data

Jun. 25, 1993 [JP] Japan ................................ 5-154823
Sep. 8, 1993 [JP] Japan ................................ 5-223082

[51] Int. Cl.$^6$ .............................. H04B 3/00; H04B 25/00
[52] U.S. Cl. ............................... 375/257; 326/90; 326/63
[58] Field of Search ..................... 375/257; 326/90–93, 326/63; 333/17.1, 18, 22 R; 370/489, 497

[56] References Cited

U.S. PATENT DOCUMENTS

| | | | |
|---|---|---|---|
| 4,486,753 | 12/1984 | Saeki et al. ........................ | 340/825.91 |
| 4,872,161 | 10/1989 | Ichinohe ................................ | 370/438 |
| 5,053,642 | 10/1991 | Ishihara et al. ........................ | 326/84 |
| 5,086,271 | 2/1992 | Haill et al. ........................ | 324/158 R |
| 5,095,231 | 3/1992 | Sartori et al. ........................ | 326/86 |
| 5,117,331 | 5/1992 | Gebara ................................ | 361/407 |
| 5,144,162 | 9/1992 | Tran ................................ | 326/86 |
| 5,179,299 | 1/1993 | Tipon ................................ | 326/86 |
| 5,237,567 | 8/1993 | Nay et al. ........................ | 370/438 |
| 5,444,740 | 8/1995 | Mizukami et al. ................. | 375/286 |

Primary Examiner—Chi H. Pham
Assistant Examiner—Bryan Webster
Attorney, Agent, or Firm—Antonelli, Terry, Stout & Kraus, LLP

[57] ABSTRACT

A bus driving system includes n bus wires having data signal wires and control signal wires, (n−1) switching circuits constituting driver circuits at a transmitting end, a precharge circuitry for precharging (n−2) bus wires and (n−1)-th bus wire with a control circuit for redistributing wire capacitances of transmission lines formed by the bus wires, and a predischarge circuitry for predischarging n-th bus wire. The switching circuits control conduction and non-conduction between (n−2) bus wires, (n−1)-th bus wire and n-th bus wire, wherein the (n−2) switching circuits respond to (n−2) bit signals and a control signal, while the (n−1)-th switching circuit responds to the control signal. The signal from the transmitting end is detected by a detection circuit at a receiving end via the transmission lines.

45 Claims, 28 Drawing Sheets

UPON COMPLETION OF PRECHARGE (TIME POINT t0)

UPON COMPLETION OF PRECHARGE (TIME POINT t0)

UPON SIGNAL OUTPUT (TIME POINT t2)

QUANTITY OF CHARGE MOVED $= \dfrac{k+1}{k+2}$

UPON SIGNAL OUTPUT (TIME POINT t2)

QUANTITY OF CHARGE MOVED $= k$

BUS WIRE DB-GND FIXED TO GROUND POTENTIAL

EMBODIMENT OF FIG. 1A & FIG. 1B

MULTIPLEXING OF BUS WIRE DB-low

MULTIPLEXING OF BUS WIRES DB-low ≈ DB-dmy

| INPUT | | | OUTPUT | |
|---|---|---|---|---|
| PRE | EN | DOUT-i | CP-i | CN-i |
| 1 | * | * | 0 | 0 |
| 0 | 0 | * | 1 | 0 |
| 0 | 1 | 0 | 1 | 1 |
| 0 | 1 | 1 | 0 | 0 |

| INPUT | | OUTPUT | | |
|---|---|---|---|---|
| EN | DOUT-i | XP-i | YN-i | ZN-i |
| 0 | * | 1 | 0 | 1 |
| 1 | 0 | 1 | 1 | 0 |
| 1 | 1 | 0 | 0 | 1 |

BUS DRIVING SYSTEM AND INTEGRATED CIRCUIT DEVICE USING THE SAME

BACKGROUND OF THE INVENTION

The present invention generally relates to a LSI (Large Scale Integrated) circuit and more particularly to a bus driving system or circuit for a microprocessor.

In general, in the microprocessor, the data transfer among function blocks is effected via a bus or buses. FIG. 3A of the accompanying drawings shows, by way of example, a bus structure used heretofore and FIG. 3B shows a timing chart for illustrating operation of the same. In the following, operation of this bus structure will be reviewed briefly.

In the beginning, it must be pointed out that FIGS. 3A and 3B show only those components which are required for the operation involved in transmission of n-bit data DOUT-1, DOUT-2, . . . , DOUT-N (where n represents a positive integer) from a function block A to a function block B via bus wires as well as reception or detection of the data as data DIN-1, DIN-2, . . . , DIN-N in a function block B. Referring to the figures, n bus wires DB-1, DB-2, . . . , DB-n which constitute an n-bit bus are precharged to a supply voltage level VCC at a time point t0. When an activation signal EN is changed over to a high level VCC in the function block A at a time point t1, n-channel MOSFETs MN-i are turned on with the bus wires DB-i being switched to a low level 0V in case the bit signals DOUT-i (i=1, 2, . . . , n) are at the low level 0V. On the other hand, when the bit signals DOUT-i are at the high level VCC (supply voltage level), the n-channel MOSFETs MN-i are maintained in the non-conducting state (off-state) with the bus wires remaining at the high level VCC. Thus, n bit-signals DOUT-1, DOUT-2, . . . , DOUT-n make appearance at the n-bit bus wires DB-1, DB-2, . . . , DB-n, respectively. When a control signal CK for the function block B assumes the high level VCC at a time point t2, the signals on the bus wires DB-1, DB-2, . . . , DB-n are fetched by flip-flops FF-1, FF-2, . . . , FF-n, respectively, to be thus received as the data DIN-1, DIN-2, . . . , DIN-n, respectively. When the precharge signal PRE becomes high (VCC) at a time point t3, the bus wires DB-1, DB-2, DB-n are precharged, whereby the bus is set to the state ready for the succeeding operation cycle which is started at a time point t4. Parenthetically, the function block A and the function block B may be regarded as conventional logic blocks such as register files, execution logic units or the like.

The bus structure known heretofore suffers a problem that a large power is consumed for charge and discharge of wiring capacitances because voltages on a number of bus wires are caused swing to the full extent during each operation cycle.

For simplification of discussion, it is now assumed that the frequency at which the high level VCC are outputted to the bus wires is equal to that of the low level 0V. Then, in the hitherto known bus structure (FIG. 3A) which includes n bus wires DB-1, DB-2, . . . , DB-n (where n represents a positive integer), there makes appearance stochastically the low level 0V at the n/2 bus wires. The voltages at these n/2 bus wires are caused to make full swing from the high level VCC to the low level 0V and then to the high level VCC during one operation cycle, as can be seen from FIG. 3B. Refer to the signal waveform DOUT-i for the bus wire DB-i (FIG. 3B). In this manner, in the case of the bus driving circuit known heretofore, voltages of many bus wires (n/2 on an average) make full swing, which involves high power consumption due to charge and discharge of the wiring capacitances.

In the recent years, the performance of the microprocessor is increasingly enhanced. In reality, microprocessors having an internal bus of a large bit-width such as a 32-bit bus or a 64-bit bus is realized (e.g. refer to ISSCC DIGEST OF TECHNICAL PAPERS, pp. 106–107, February 1992). In the bus driving circuit for these high-performance microprocessors, the problem concerning the power consumption of the bus system becomes serious because the power consumption is in proportion to the bit-width (n) of the bus.

Another problem of the bus structure known heretofore can be seen in that signals on the neighboring bus wires are superposed on the inherent bus signal as the noise through the medium of inter-wire capacitances, thus giving rise to degradation of the noise margin and hence erroneous operation of the bus system. This problem will be elucidated below by reference to FIGS. 24A and 24B of the accompanying drawings.

Referring to FIG. 24A, switches S-1, S-2 and S-3 schematically represent the n-channel MOSFETs MN-1, MN-2 and MN-3, respectively, in the bus structure shown in FIG. 3A. It is assumed that the bus wires DB-1, DB-2 and DB-3 are physically juxtaposed in the order as illustrated. It is again assumed that the switches S-1 and S-3 are turned on with the switch S-2 being held in the off-state after the associated bus wires have been precharged. In that case, the signal on the bus wire DB-2 should intrinsically be held at the high level VCC. However, noise brought about when the signals on the neighboring bus wires DB-1 and DB-3 shift from the high level VCC to the low level 0V is superposed onto the signal of the bus wire DB-2 through the medium of the inter-wire capacitance. As a consequence, the potential on the bus wire DB-2 is pulled down to a level lower than the high level VCC. This crosstalk noise becomes more remarkable as the inter-wire capacitance of the bus increases, to thereby degrade the margin for noise (or noise margin). In an extreme case, the potential at the bus wire DB-2 may be pulled down to the level below a logical threshold value of the CMOS (Complementary metal-Oxide Semiconductor) circuit to be erroneously detected as the low-level signal.

SUMMARY OF THE INVENTION

In the light of the state of the art described above, it is an object of the present invention to provide a improved bus driving circuit which can enjoy low power consumption as well as an integrated circuit device incorporating such bus driving circuit and a system including a microcomputer incorporating an improved bus driving circuit.

Another object of the present invention is to provide a bus driving system of which power consumption scarcely increases even when the bit-width of a bus is increased.

A further object of the invention is to provide a bus driving system which can suffer neither degradation in the noise margin due to the inter-wire crosstalk nor erroneous bus operation.

In view of the above and other objects which will become apparent as description proceeds, there is provided according to an aspect of the invention a bus driving system which includes bus wires wired between a transmitting end and a receiving end for carrying a plurality of data signals and control signals, a driver circuit provided at the transmitting end for driving the bus wires, a control circuit for redistributing wiring capacitances of transmission lines formed by the bus wires, and a detection circuit provided at the receiving end for detecting bus signals.

As a preferred mode for carrying out the invention, there is provided a bus driving system for transmitting data of n bits (where n is a positive integer) from a transmitting end to a receiving end, which circuit includes (n+2) control wires and bus wires including first to (n+2)-th wires (DB-1, DB-2, . . . , DB-n, DB-low, DB-dmy), at least one set of (n+1) switching circuits including first to (n+1)-th switching circuits (MN-1, MN-2, . . . , MN-n, MN-low) and serving as driver circuits, a means (PREP-1, PREP-2, . . . , PREP-n, PREP-low) for making potentials at the first to (n+1)-th wires (DB-1, DB-2, . . . , DB-n, DB-low) coincide with a level of a first operation potential level (VCC), and a means for making potential at the (n+2)-th wire coincide with a second operation potential level (GND), wherein a k-th switching circuit (MN-low if k=n+1 and, if otherwise, MN-k, where k is a given integer greater than 1 (one) and smaller than (n+1)) controls conduction and non-conduction between the k-th wire (DB-low if k=n+1 and, if otherwise, DB-k) and the (n+2)-th wire (DB-dmy), the first to n-th switching circuits (MN-1, MN-2, . . . , MN-n) respond to the first to the n-th bit signals (DOUT-1, DOUT-2, . . . , DOUT-n), respectively, and wherein the first to the (n+1)-th switching circuits (MN-1, MN-2, . . . , MN-n, MN-low) respond to a first control signal (EN).

In another preferred mode for carrying out the invention, the bus includes at least one set of first to n-th amplifier circuits (AMP-1, AMP-2, . . . , AMP-n) serving as detection circuits, respectively, wherein an i-th amplifier circuit (AMP-i, where i represents a given integer greater than 1 (one) and smaller than n inclusive thereof) includes first and second n-channel metal oxide semiconductor field effect transistors or MOSFETs (MN-1, MN-2) each having a source terminal connected to a first node (N1) and a drain terminal connected to a second node (N2), third and fourth n-channel MOSFETs (MN-3, MN-4) each having a source terminal connected to the first node (N1) and a drain terminal connected to a third node (N3), a fifth n-channel MOSFET (MN-5) having a source terminal connected to the second node (N2), a drain terminal connected to a fourth node (N4) and a gate terminal connected to a fifth node (N5), a sixth n-channel MOSFET (MN-6) having a source terminal connected to the third node (N3), a drain terminal connected to the fifth node (N5) and a gate terminal connected to the fourth node (N4), a first p-channel MOSFET (MP-1) having a drain terminal connected to the fourth node (N4), a gate terminal connected to the fifth node (N5) and a source terminal connected to a first power source (VCC), a second p-channel MOSFET (MP-2) having a drain terminal connected to the fifth node (N5), a gate terminal connected to the fourth node (N4) and a source terminal connected to the first power source (VCC), a first switching circuit (MP-3) for controlling conduction and non-conduction between the fourth node (N4) and the first power source (VCC), a second switching circuit (MP-4) for controlling conduction and non-conduction between the fifth node (N5) and the first power source (VCC), and a third switching circuit (MN-7) for controlling conduction and non-conduction between the first node (N1) and a second power source (GND), wherein the gate terminals of the first and second n-channel MOSFETs (MN-1, MN-2) are connected to the i-th wire (DB-i), and wherein one of the gate terminals of the third and fourth n-channel MOSFETs (MN-3, MN-4) is at a same potential as the first operation potential level (VCC) while the other gate terminal is connected to the (n+1)-th wire (DB-low).

According to still another preferred mode for carrying out the invention, there is provided a bus driving system which includes bus wires wired between a transmitting end and a receiving end for carrying a plurality of data signals and control signals, a driver circuit provided at the transmitting end for driving the bus wires, a control circuit for redistributing wiring capacitances of transmission lines formed by the bus wires, and a detection circuit provided at the receiving end for detecting bus signals, wherein the control signals are delivered from first to fourth control wires, the first control wire is usually at zero level and assumes an intermediate level between a level substantially equal to the supply voltage level and a level substantially equal to the ground level upon redistribution of the wiring capacitances of the transmission lines formed by the bus wires, the second and third control wires are usually at the supply voltage level and assume an intermediate level between a level substantially equal to the supply voltage level and a level substantially equal to the ground level upon redistribution of wiring capacitances of the transmission lines formed by the bus wires, respectively, and wherein the fourth wire is disposed adjacent to the second and third control lines and usually at the supply voltage level while assuming a level substantially equal to the supply voltage level upon redistribution of the wiring capacitances of the transmission lines formed by the bus wires.

More specifically, the bus structure for transmitting data of n bits (where n is a positive integer) is comprised of (n+4) wires including first to (n+4)-th wires (DB-1, DB-2, . . . , DB-n, DB-low, DB-high, DB-dmy), at least one set of (n+2) switching circuits including first to (n+2)-th switching circuits (MN-1, MN-2, . . . , MN-n, MN-low, MN-low+), a means (PREP-1, PREP-2, . . . , PREP-n, PREP-low, PREP-low+, PREP-high) for making potentials at the first to (n+3)-th wires (DB-1, DB-2, . . . , DB-n, DB-low, DB-low+, DB-high) coincide with a level of a first operation potential level (VCC), and a means (PREN-dmy) for making potential at the (n+4)-th wire (DB-dmy) coincide with a second operation potential level (GND), wherein a k-th switching circuit (MN-low if k=n+1, MN-low+ if k=n+2 and, if otherwise, MN-k, where k is a given integer greater than 1 (one) and smaller than (n+2)) controls conduction and non-conduction between the k-th wire (DB-low if k=n+1, DB-low+ if k=n+2 and, if otherwise, DB-k) and the (n+4)-th wire (DB-dmy), wherein the first to n-th switching circuits (MN-1, MN-2, . . . , MN-n) respond to the first to n-th bit signals (DOUT-1, DOUT-2, . . . , DOUT-n), respectively, and wherein the first to (n+2)-th switching circuits (MN-1, MN-2, . . . , MN-n, MN-low, MN-low+) respond to the first control signal (EN).

In a further preferred mode for carrying out the invention, the bus includes at least one set of first to n-th amplifier circuits (AMP-1, AMP-2, . . . , AMP-n), wherein the i-th amplifier circuit (where i represents a given integer greater than 1 (one) and smaller than n inclusive thereof) includes first and second n-channel MOSFETs (MN-1, MN-2) each having a source terminal connected to a first node (N1) and a drain terminal connected to a second node (N2), third and fourth n-channel MOSFETs (MN-3, MN-4) each having a source terminal connected to the first node (N1) and a drain terminal connected to a third node (N3), a fifth n-channel MOSFET (MN-5) having a source terminal connected to the second node (N2), a drain terminal connected to a fourth node (N4) and a gate terminal connected to a fifth node (N5), a sixth n-channel MOSFET (MN-6) having a source terminal connected to the third node (N3), a drain terminal connected to the fifth node (N5) and a gate terminal connected to the fourth node (N4), a first p-channel MOSFET (MP-1) having a drain terminal connected to the fourth node (N4), a gate terminal connected to the fifth node (N5) and a source terminal connected to a first power source (VCC), a second p-channel MOSFET (MP-2) having a drain terminal connected to the fifth node (N5), a gate terminal connected to the fourth node (N4) and a source terminal connected to the first power source (VCC), a first switching circuit (MP-3) for controlling conduction and non-conduction between the fourth node (N4) and the first power source (VCC), a second switching circuit (MP-4) for controlling conduction and non-conduction between the fifth node (N5) and the first power source (VCC), and a third switching circuit (MN-7) for controlling conduction and non-conduction between the first node (N1) and a second power source (GND), wherein the gate terminals of the first and second n-channel MOSFETs (MN-1, MN-2) are connected to the i-th wire (DB-i), and wherein one of the gate terminals of the third and fourth n-channel MOSFETs (MN-3, MN-4) is connected to the (n+1)-th wire (DB-low) while the other gate terminal is connected to the (n+2)-th wire (DB-high).

In a preferred embodiment of the invention (FIGS. 1A, 1B of the accompanying drawings), the first to (n+1)-th bus wires (DB-1, DB-2, ..., DB-n and DB-low) are maintained at a potential corresponding to a voltage of a power source VCC while a bus wire (DB-dmy) is coupled to the ground potential (0V) at a time point t0. At this time point, since a first control signal (EN) is at a low level (0V), the first to (n+1)-th switching circuits (MN-1, MN-2, ..., MN-n and MN-low) are in the non-conducting state. When the first control signal (EN) changes to the high level (VCC) at a time point (t1), the first to n-th switching circuits (MN-1, MN-2, ..., MN-n) remain in the non-conducting state or become conducting in dependence on the high level (VCC) or low level (0V) of the bit signals (DOUT-1, DOUT-2, ..., DOUT-n), respectively. On the other hand, the (n+1)-th switching circuit (MN-low) is turned on. Assuming now that k switching circuits (MN-#1, MN-#2, ..., MN-#k) of the first to n-th switching circuits (MN-1, MN-2, ..., MN-n) are turned on (i.e., become conducting), the electric charge stored in the wiring capacitances of the (k+1) bus wires (DB-#1, DB-#2, ..., DB-#k and DB-low) is distributed to the (k+2) bus wires (DB-#1, DB-#2, DB-#k, DB-low and DB-dmy), the potential of which thus settles at an intermediate level (V-low) which lies between the supply voltage (VCC) and the ground potential (0V). On the other hand, the remaining bus wires (i.e., those of the bus wires DB-1, DB-2, ..., DB-n except for the bus wires DB-#1, DB-#2, ..., DB-#k) are left in the state applied with the supply voltage (VCC). When the activation signal (ACT) changes to the high level (VCC) at a time point (t2), the first to n-th amplifier circuits (AMP-1, AMP-2, ..., AMP-n) are put into operation. In each of the amplifier circuits (AMP-i) (where i=1, 2, ..., n), a pseudo-reference potential is generated at an intermediate level between the supply voltage (VCC) and the aforementioned potential (V-low), whereon differential amplification is performed on the input potential of the bus wires (DB-i) with reference to the pseudo-reference potential, as a result of which output data (DIN-1, DIN-2, ..., DIN-n) of high level (VCC) and low level (0V) are outputted from the amplification circuits (AMP-i) in dependence on the potentials (VCC) and (V-low) of the bus wires (DB-1, DB-2, ..., DB-n). When a precharge signal (PRE) changes to the high level (VCC) at a time point (t3), the first to (n+1)-th bus wires (DB-1, DB-2, ..., DB-n and DB-low) are charged to the potential corresponding to the supply voltage (VCC) by the potential-coincidence establishing means (PREP-1, PREP-2, ..., PREP-n and PREP-low), while the (n+2)-th bus wire (DB-dmy) is discharged via the means (PREN-dmy) for establishing coincidence with the ground potential (0V) to thereby assume the state ready for a succeeding operation cycle.

With the bus driving system according to the present invention, there can be obtained a great advantage that the power consumption as involved will never exceed an amount of power consumed by a single bus wire in the bus driving system of the hitherto known configuration regardless whether the signal swing occurs at any number of bus wires, the reason for which can be explained as follows.

For simplification of description, it is now assumed that the wiring capacitances of the wires constituting the bus are equal to one another and that the quantity of electric charge required for charging the capacitances to the supply voltage (VCC) from the ground potential (0V) is given by "1" (unity). As will readily be understood, it is possible to estimate the power consumption by examining the quantity of charge as moved during a single operation cycle. In the bus driving system known heretofore (see FIG. 3), when a signal of low level (0V) is outputted to k bus wires (DB-#1, DB-#2, ..., DB-#k), the charge k stored in the k bus wires (DB-#1, DB-#2, ..., DB-#k) upon completion of the precharge are all discharged to 0 (zero) in response to the output of the low-level signal (0V). This means that the quantity of charge as moved is equal to k. In contrast, in the case of the bus driving system according to the present invention (e.g. see FIG. 1), at the time point when the signal of low level (V-low) is outputted to the k bus wires (DB-#1, DB-#2, ..., DB-#k), then a quantity of charge given by (k+1) is stored in the (k+1) bus wires including the above-mentioned bus wires and one additional bus wire (DB-low) through the precharge process. Thus, upon outputting of the low-level signal (V-low), the charge is distributed to the (k+1) bus wires (DB-#1, DB-#2, ..., DB-#k and DB-low), which results in that each of the (k+2) bus wires (DB-#1, DB-#2, ..., DB-#k, DB-low and DB-dmy) bears a quantity of charge given by "(k+1)/(k+2)" which can never exceed a value of "1" in any case. It is thus apparent that with the bus driving system according to the present invention, the power consumption will not exceed a power consumed by a single bus wire of the hitherto known bus system regardless of whether the signal swing takes place at any number of bus wires.

In another preferred embodiment of the invention (see FIG. 23, by way of example), the potentials at the first to (n+3)-th bus wires (DB-1, DB-2, ..., DB-n, DB-low, DB-low+, DB-high) are kept at the supply voltage level (VCC) while the potential at the bus wire (DB-dmy) is maintained at the ground potential (0V). At this time point, since the control signal (EN) is at the low level (0V), the first to (n+2)-th switching circuits (MN-1, MN-2, ..., MN-n, MN-low, MN-low+) are not conducting.

When a first control signal (EN) changes to the high level (VCC) at a time point (t1), the first to n-th switching circuits (MN-1, MN-2, ..., MN-n) remain in the non-conducting state or become conducting in dependence on whether the bit signals (DOUT-1, DOUT-2, ..., DOUT-n) are at the high level (VCC) or at the low level (0V), respectively. On the other hand, the (n+l)-th and (n+2)-th switching circuits (MN-low and MN-low+) are switched on. Assuming, by way of example, that the k switching circuits (MN-#1, MN-#2, ..., MN-#k) of the switching circuits (MN-1, MN-2, ..., MN-n) are switched on, the (k+3) bus wires (DB-#1, DB-#2, ..., DB-#k, DB-low, DB-low+ and DB-dmy) share the charge stored in the wiring capacitances of the (k+2) bus wires (DB-#1, DB-#2, ..., DB-#k, DB-low and DB-low+), whereby the potentials on the former settles at a potential level (also designated by V-low) which lies between the supply voltage level (VCC) and the ground potential (0V). In contrast, the potentials at the other bus wires than the bus wires (DB-#1, DB-#2, . . . , DB-#k) as well as the bus wire (DB-high) remain as maintained at the supply voltage level (VCC).

When the activation signal (ACT) changes to the high level (VCC) at a time point (t2), the amplifiers (AMP-1, AMP-2, . . . , AMP-n) are put into operation. In each of the amplifiers (AMP-i where i=1, 2, . . . , n), a pseudo-reference potential lying intermediate between the potentials (VCC) and (V-low) of the bus wires (DB-high and DB-low) is generated on the basis of the potentials (VCC, V-low), wherein differential amplification is performed for the signals inputted to the bus wires (DB-i) with reference to the reference potential. Thus, the output data (DIN-1, DIN-2, . . . , DIN-n) of the amplifiers assume the high level (VCC) or low level (0V) in correspondence to the potentials (VCC) or (V-low) of the bus wires (DB-1, DB-2, . . . , DB-n).

When the precharge signal (PRE) changes to the high level (VCC) at a time point (t3), the first to (n+3)-th bus wires (DB-1, DB-2, . . . , DB-n, DB-low and DB-low+) are charged up to the supply voltage level (VCC) via the means (PREP-1, PREP-2, . . . , PREP-n, PREP-low, PREP-low+ and PREP-high) for establishing coincidence with the supply voltage level (VCC), respectively, while the (n+4)-th bus wire (DB-dmy) is discharged to the ground potential (0V) via the means (PREN-dmy) for establishing coincidence with the ground potential (0V), to be thereby set to the state ready for the succeeding operation cycle.

In the bus driving system according to yet another preferred embodiment of the invention, measures are taken for protecting the bus driving system against degradation in the noise margin due to the crosstalk noise between the neighboring bus wires and hence against erroneous operation. (For more particular, description will be made later on by reference to FIG. 26 of the accompanying drawings.)

Switches (S-1, S-2, S-3, S-low and S-low+) schematically represent the n-channel MOS transistors (MN-1, MN-2, MN-3, MN-low and MN-low+), respectively. It is assumed that in succession to completion of the precharge of the bus wires, the switches (S-1 and S-3) are turned on with the switch (S-2) remaining in the off-state (nonconducting state). When the signals on the bus wires (DB-1 and DB-3) shift from the high level to the low level, the crosstalk noise will be superposed onto the signal of the bus wire (DB-2), whereby the potential at the bus wire (DB-2) is pulled down from the intrinsically high level (VCC). In that case, however, the high-level signal (DB-high) serving as the reference level in the amplifier circuit is affected by the crosstalk noise which is utterly equivalent to the level shift taking place at the neighboring bus wire (DB-2) due to the potential shift from high to low level at the neighboring bus wires (DB-low and DB-low+). As a consequence, the crosstalk noise components making appearance at the bus wires (DB-2 and DB-high) upon differential amplification operation of the amplifier circuit (AMP-2) cancel out each other, to thereby prevent degradation in the noise margin as well as erroneous bus operation.

Thus, according to the present invention, it is possible to operate the whole bus system with a power consumption which amounts to no more than the power consumed by the single bus wire in the conventional bus system, whereby a bus system which can enjoy remarkably low power consumption can be realized.

Besides, the bus system is protected against any appreciable degradation in the noise margin due to the inter-wire crosstalk and hence erroneous bus operation due to the crosstalk noise.

DESCRIPTION OF THE PREFERRED EMBODIMENTS

Now, the present invention will be described in detail in conjunction with the preferred or exemplary embodiments thereof by reference to the drawings.

Figure 1A:
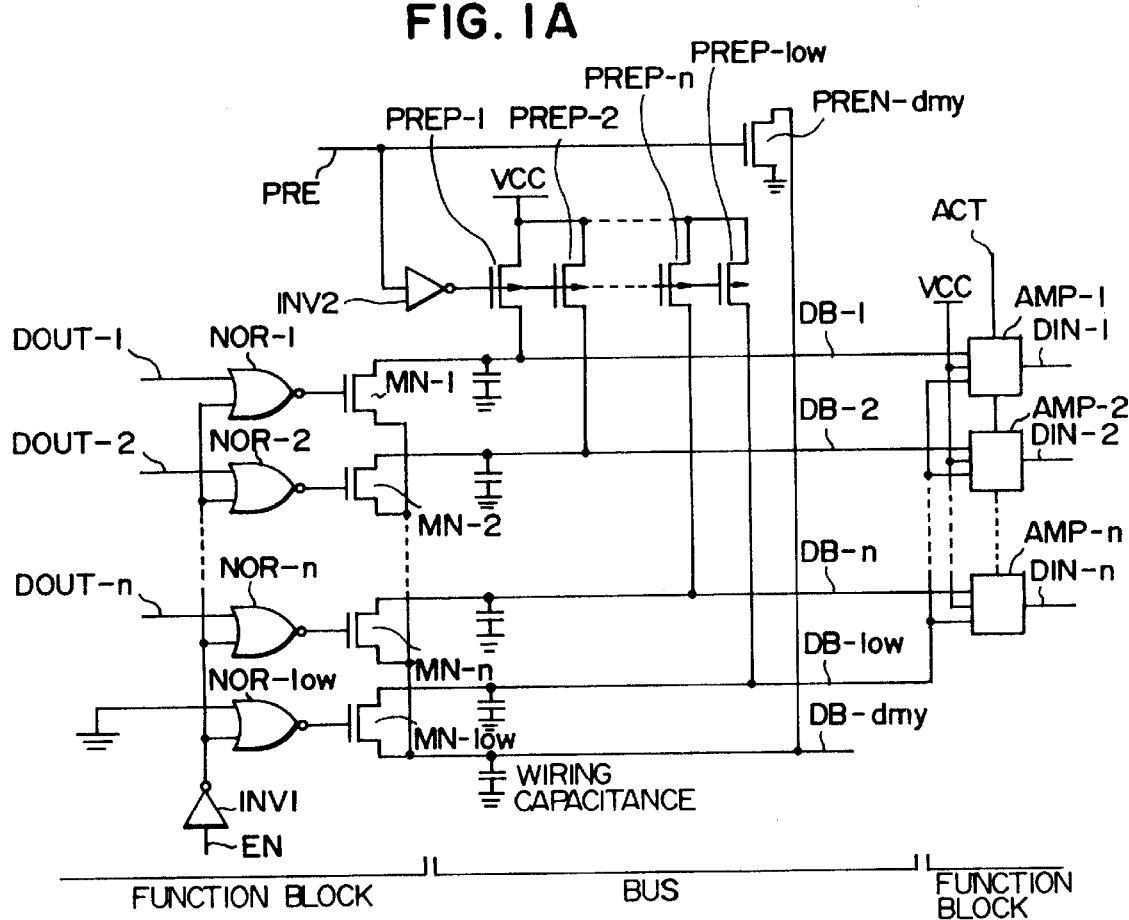
FIG. 1A is a wiring circuit diagram showing a bus driving system according to an embodiment of the present invention.
Figure 1B:
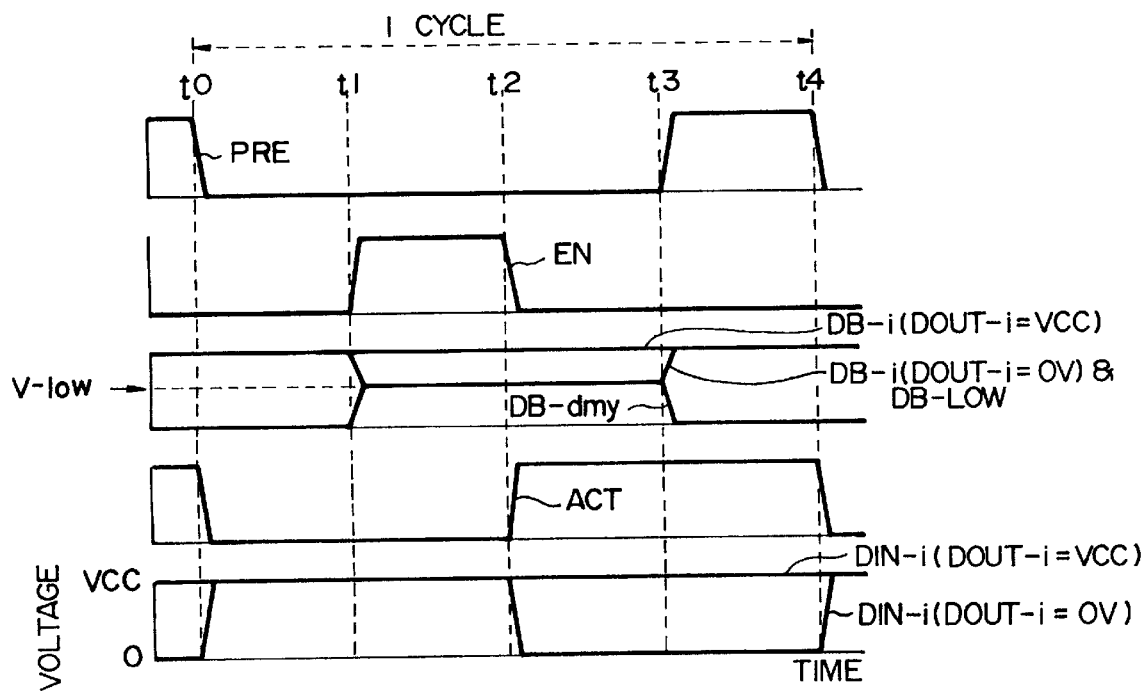
FIG. 1B is a signal timing chart (or signal waveform diagram) for illustrating operation of the driving system shown in FIG. 1A.

FIG. 1A is a circuit diagram showing a bus driving system according to an embodiment of the present invention, and FIG. 1B is a timing chart showing various signals for illustrating operation of the driver circuit. Referring to the figures, at a time point t0, (n+1) bus wires DB-1, DB-2, . . . , DB-n and DB-low are maintained at a potential corresponding to a voltage level of a power source VCC via p-channel MOSFETs PREP-1, PREP-2, . . . , PREP-n and PREP-low, respectively, while a bus wire DB-dmy is coupled to the ground potential 0V via an n-channel MOSFET PREN-dmy. At this time point, since a control signal EN is at a low level 0V, n-channel MOSFETs MN-1, MN-2, . . . , MN-n and MN-low are in the non-conducting state. When the control signal EN changes to the high level VCC at a time point t1, the n-channel MOSFETs MN-1, MN-2, . . . , MN-n remain in the non-conducting state or become conducting in dependence on high level VCC or low level 0V of the bit signals DOUT-1, DOUT-2, . . . , DOUT-n, respectively. The n-channel MOSFET (MN-low) is turned on. Assuming now that k n-channel MOSFETs MN-#1, MN-#2, . . . , MN-#k of the n-channel MOSFETs MN-1, MN-2, . . . , MN-n are turned on, electric charge stored in the wiring capacitances of (k+1) bus wires DB-#1, DB-#2, . . . , DB-#k and DB-low is distributed to the (k+2) bus wires DB-#1, DB-#2, DB-#k, DB-low and DB-dmy, the potential of which thus settles at an intermediate level V-low which lies between the supply voltage VCC and the ground potential 0V. On the other hand, the remaining bus wires (i.e., those of the bus wires DB-1, DB-2, . . . , DB-n except for the bus wires DB-#1, DB-#2, . . . , DB-#k) are left in the state applied with the supply voltage VCC. When the activation signal ACT changes to the high level VCC at a time point t2, amplifier circuits AMP-1, AMP-2, . . . , AMP-n are put into operation. In each of the amplifier circuits AMP-i (where i=1, 2, . . . , n), a pseudo-reference potential is generated at an intermediate level between the supply voltage VCC and the aforementioned potential V-low, whereon differential amplification is performed on the input potential of the bus wires DB-i with reference to the pseudo-reference potential, as a result of which output data DIN-1, DIN-2, . . . , DIN-n of high level VCC and low level 0V are outputted from the amplification circuits AMP-i in dependence on the potentials VCC and V-low of the bus wires DB-1, DB-2, . . . , DB-n. When a precharge signal PRE changes to the high level VCC at a time point t3, the (n+1) bus wires DB-1, DB-2, . . . , DB-n and DB-low are charged to the potential corresponding to the supply voltage VCC via the p-channel MOSFETs PREP-1, PREP-2, . . . , PREP-n and PREP-low, while the bus wire DB-dmy is discharged to the 0V via the n-channel MOSFET PREN-dmy to assume the state ready for a succeeding operation cycle.

Figure 2:
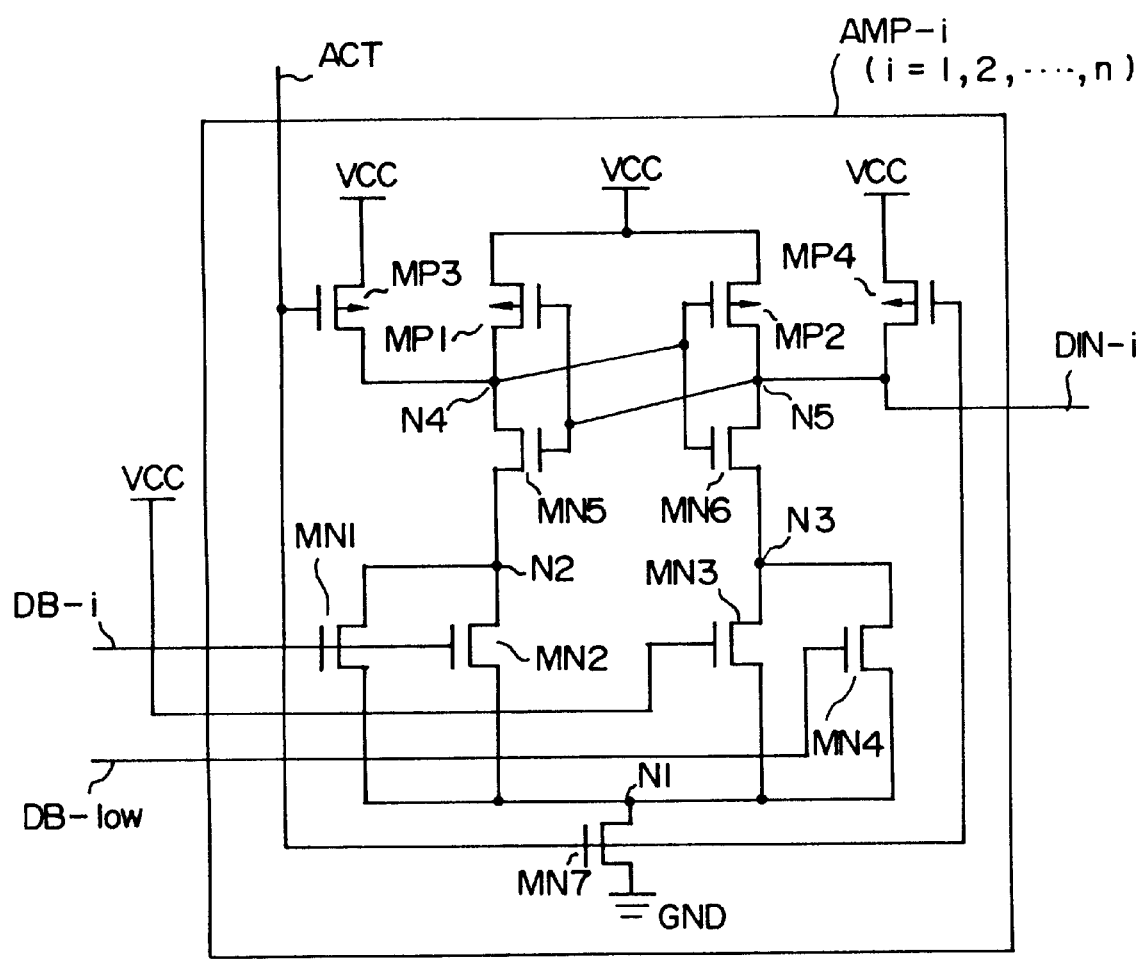
FIG. 2 is a circuit diagram showing a circuit configuration of a differential amplifier employed in the bus driving system shown in FIG. 1A according to an embodiment of the present invention.
Figure 3A:
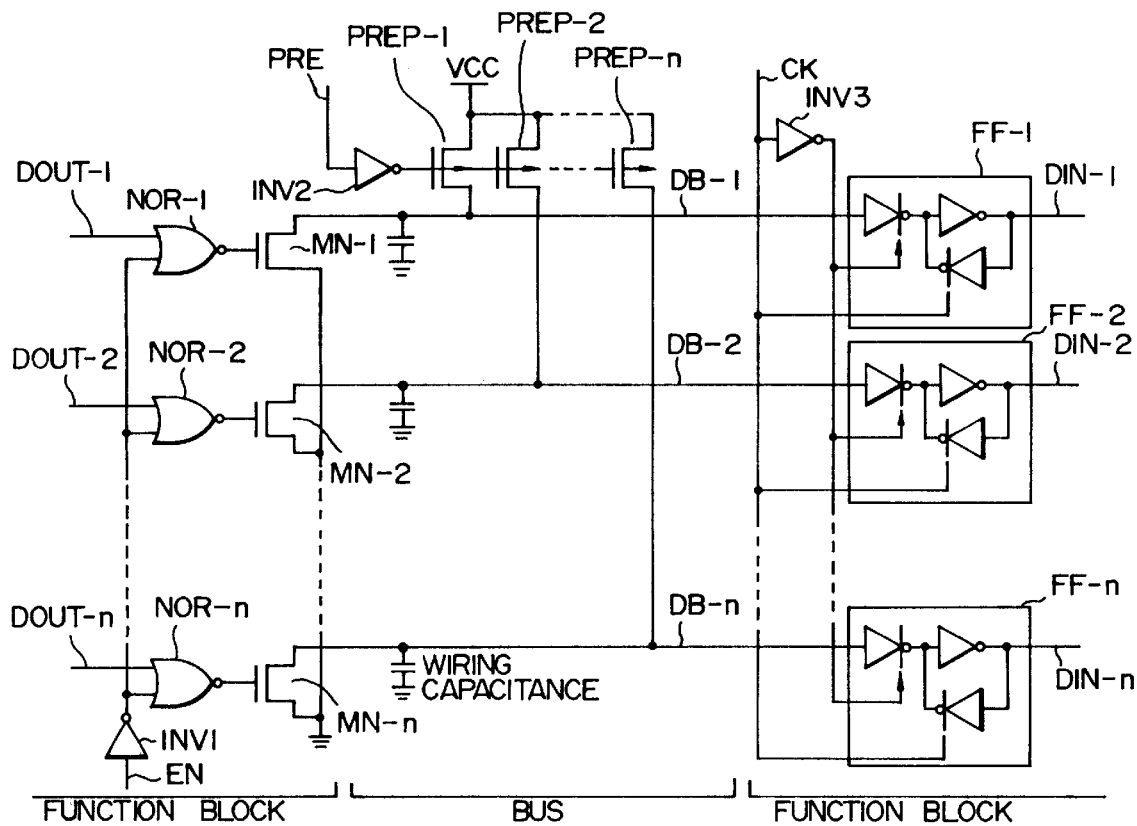
FIG. 3A is a wiring circuit diagram showing a bus driving system known heretofore.
Figure 3B:
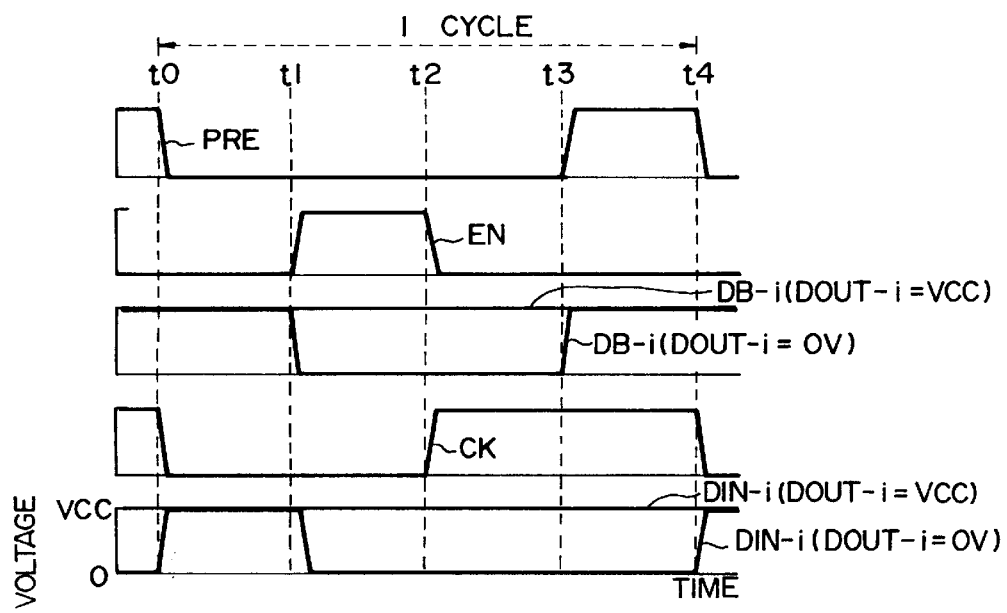
FIG. 3B is a signal timing chart for illustrating operation of the same.

FIG. 2 shows a circuit configuration of a differential amplifier circuit employed in the bus driver circuit (FIG. 1A)

according to the instant embodiment of the invention. Concerning the timings of the signals partaking in operation, reference should be made to FIG. 1B.

During a period from the time point t0 to the time point t2, the activation signal ACT is at low level. Thus, p-channel MOSFETs MP-3 and MP-4 are in the conducting state, whereby potential at nodes N4 and N5 are maintained at the level of the supply voltage VCC. On the other hand, the n-channel MOSFET MN-7 is in the non-conducting state, whereby a current flow path within this circuitry is interrupted or cut off.

When the activation signal ACT changes to the high level VCC at the time point t2, the p-channel MOSFETs MP-3 and MP-4 become non-conducting with the n-channel MOSFET MN-7 being turned on (i.e., to the conducting). The n-channel MOSFET MN-7 tends to pull down the potential at the node N2 to the ground level 0V via the n-channel MOSFETs MN-1 and MN-2, while pulling down the node N2 to the ground potential 0V via the n-channel MOSFETs MN-3 and MN-4. The path extending from the node N2 to the node N1 assumes a high conducting state or a feeble or low conducting state in dependence on the high level VCC or low level V-low of the bus wire DB-i. Further, since the high level VCC is applied to a gate of the n-channel MOSFET MN-3 with the low-level V-low being inputted to a gate of the n-channel MOSFET (MN-4), the path extending from the node N3 to the node N1 is in an intermediate conducting state because the high level VCC is applied to a gate of the n-channel MOSFET MN-3 with the low level V-low being inputted to the gate of the n-channel MOSFET MN-4. The conduction degree relation between the two paths N2→N1 and N3→N1 is transmitted to a latch circuit constituted by n-channel MOSFET MN-5 and MN-6 and p-channel MOSFETs MP-1 and MP-2 to be extracted as output data DIN-i of high level VCC or low level 0V. By way of example, let's assume that the voltage of the bus wire DB-i is of high level VCC. In that case, because the node N2 is pulled down closer to the ground potential 0V than the node N3, the conduction through the n-channel MOSFET MN-5 becomes higher than that of the n-channel MOSFET MN-6, which renders conduction of the p-channel MOSFET MP-2 higher than that of the p-channel MOSFET MP-1. As a result of this, conduction of the n-channel MOSFET MN-5 becomes higher than that of the n-channel MOSFET MN-6. Thus, a positive feedback is validated for the latch circuit to make the n-channel MOSFET MN-5 and the p-channel MOSFET MP-2 conduct fully while rendering the n-channel MOSFET MN-6 and the p-channel MOSFET MP-1 to the utterly non-conducting state, which result in that the high level VCC is outputted as the data DIN-i. On the contrary, when the voltage of the bus wire DB-i is of the low level V-low, the n-channel MOSFET MN-6 and the p-channel MOSFET MP-1 are caused to conduct fully or completely while the n-channel MOSFET MN-5 and the p-channel MOSFET MP-2 are made utterly non-conductive through the similar positive feedback operation, whereby data DIN-i of the low level 0V is outputted from the latch circuit. Parenthetically, after completion of the positive feedback operation of the latch circuit, there is no more available any path for the DC current flow. Thus, it can be understood that power consumption of this amplifier circuit is limited to only an extremely short period from the activation at the time point t2 to the fixation of the level of the data DIN-i.

Figure 5:
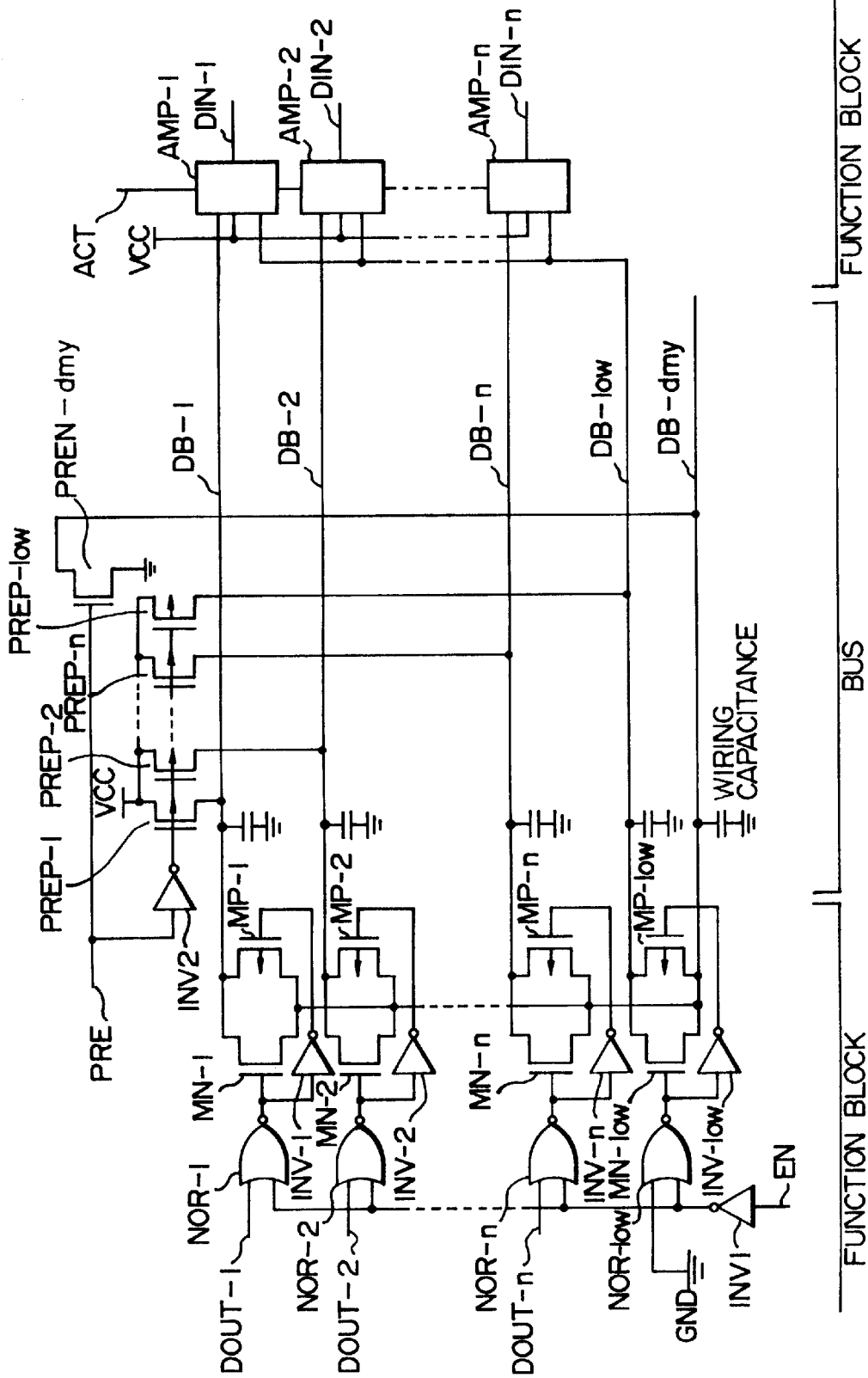
FIG. 5 is a circuit diagram showing a bus driving system according to another embodiment of the present invention.

FIG. 5 is a circuit diagram showing a bus driving system according to another embodiment of the present invention. This bus driving system differs from that shown in FIG. 1A in that p-channel MOSFETs are connected in parallel with the n-channel MOSFETs MN-1, MN-2, . . . , MN-n, MN-low, respectively. By connecting the MOSFETs of opposite polarities in parallel in this manner, the potentials of the bus wires interconnected via the drain-source paths of these MOSFETs can positively be made to be at a same level.

Figure 6A:
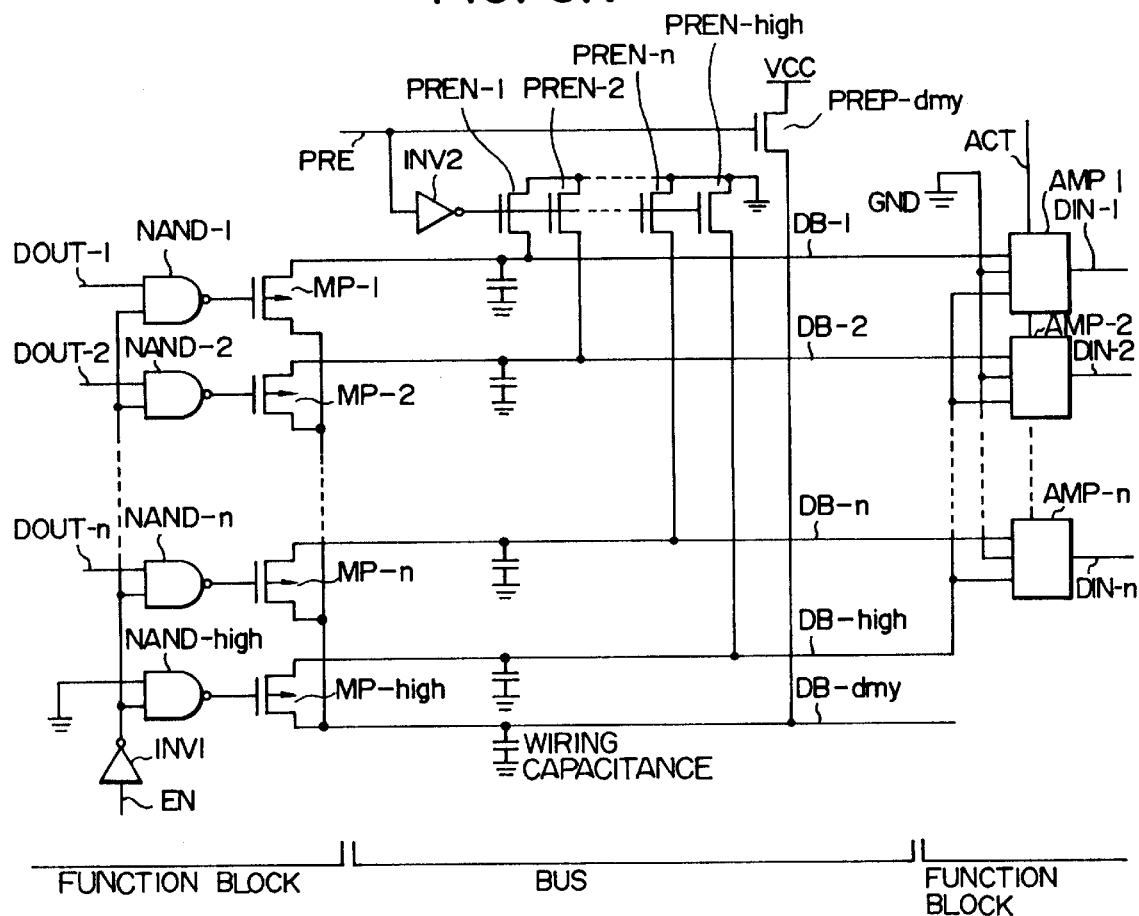
FIG. 6A is a circuit diagram showing a bus structure according to yet another embodiment of the present invention.
Figure 6B:
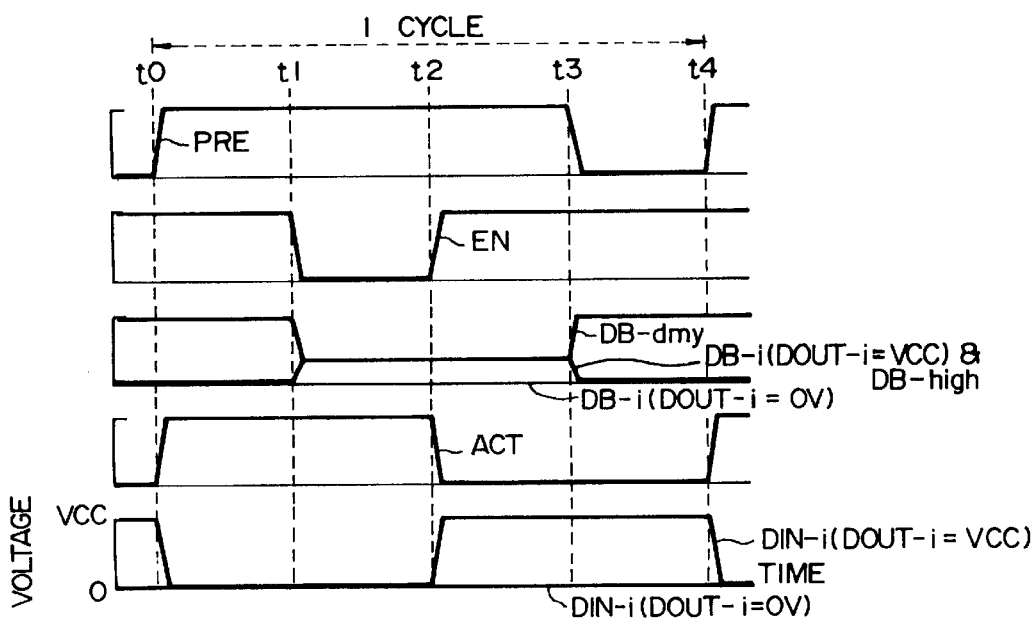
FIG. 6B is a timing chart for illustrating operation of the same.

FIG. 6A shows a bus structure according to another embodiment of the present invention which differs from that shown in FIG. 1A in that the polarities of all the MOSFETs and the power source are inverted. FIG. 6B shows a timing chart of various signals. Since operation of this bus structure can be understood by those skilled in the art on the basis of the description made by reference to FIG. 1A, further elucidation will be unnecessary. At this juncture, it should, however, be mentioned that the n-channel MOSFETs MN-1, MN-2, . . . , MN-n, MN-low may be connected in parallel with the p-channel MOSFETs MP-1, MP-2, . . . , MP-n, MP-low, respectively, in the utterly same manner as the bus structure shown in FIG. 5 to the substantially same effect.

Figure 7:
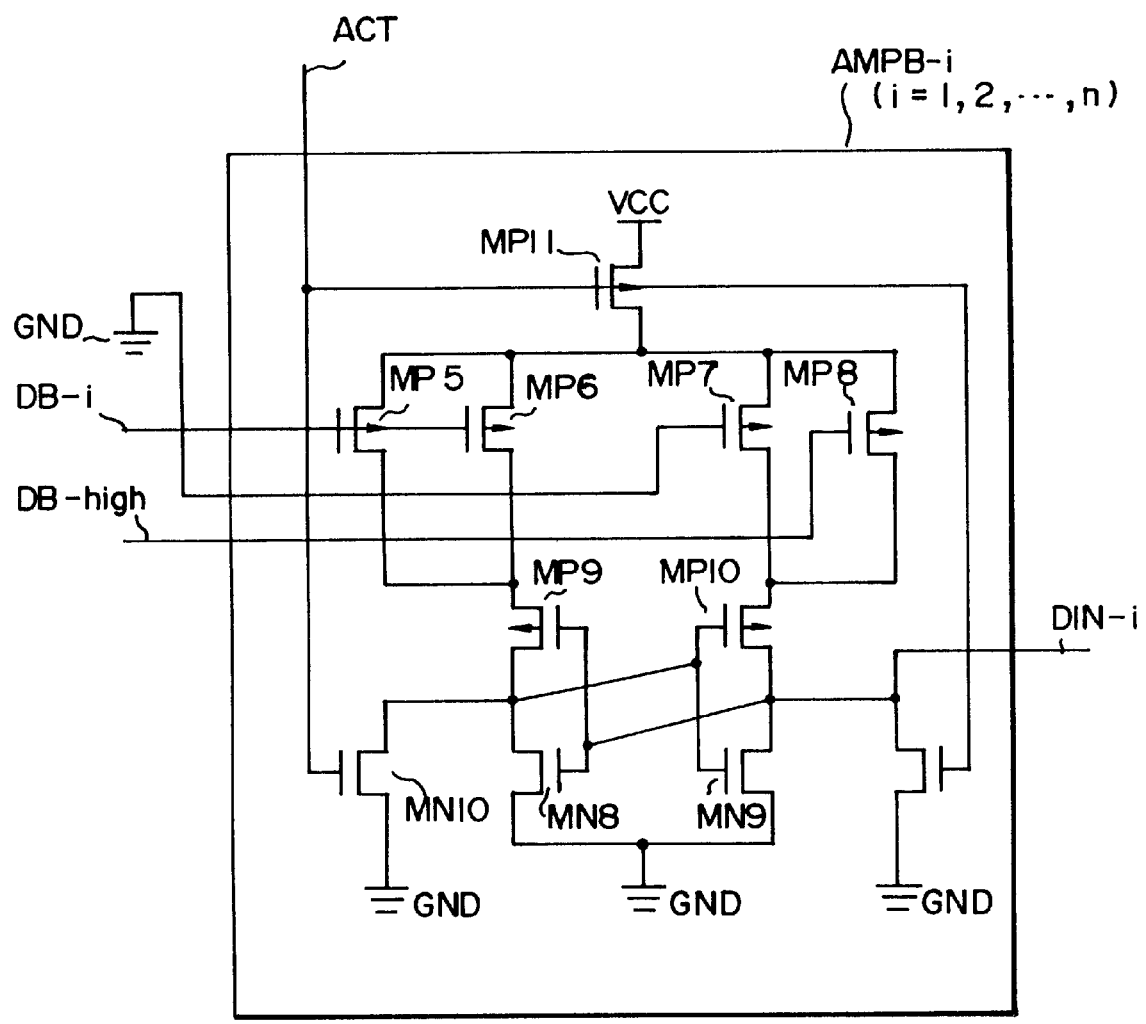
FIG. 7 is a circuit diagram showing a configuration of an amplifier which can be employed in the bus driving system according to the present invention.

FIG. 7 shows a configuration of an amplifier AMP-B-i (where i=1, 2, . . . , n) employed in the embodiment described above by reference to FIGS. 6A and 6B. In the case of this embodiment of the invention, all the MOSFETs and the power source are reversed as compared those of with the amplifiers AMP-i (i=1, 2, . . . , n).

Figure 8:
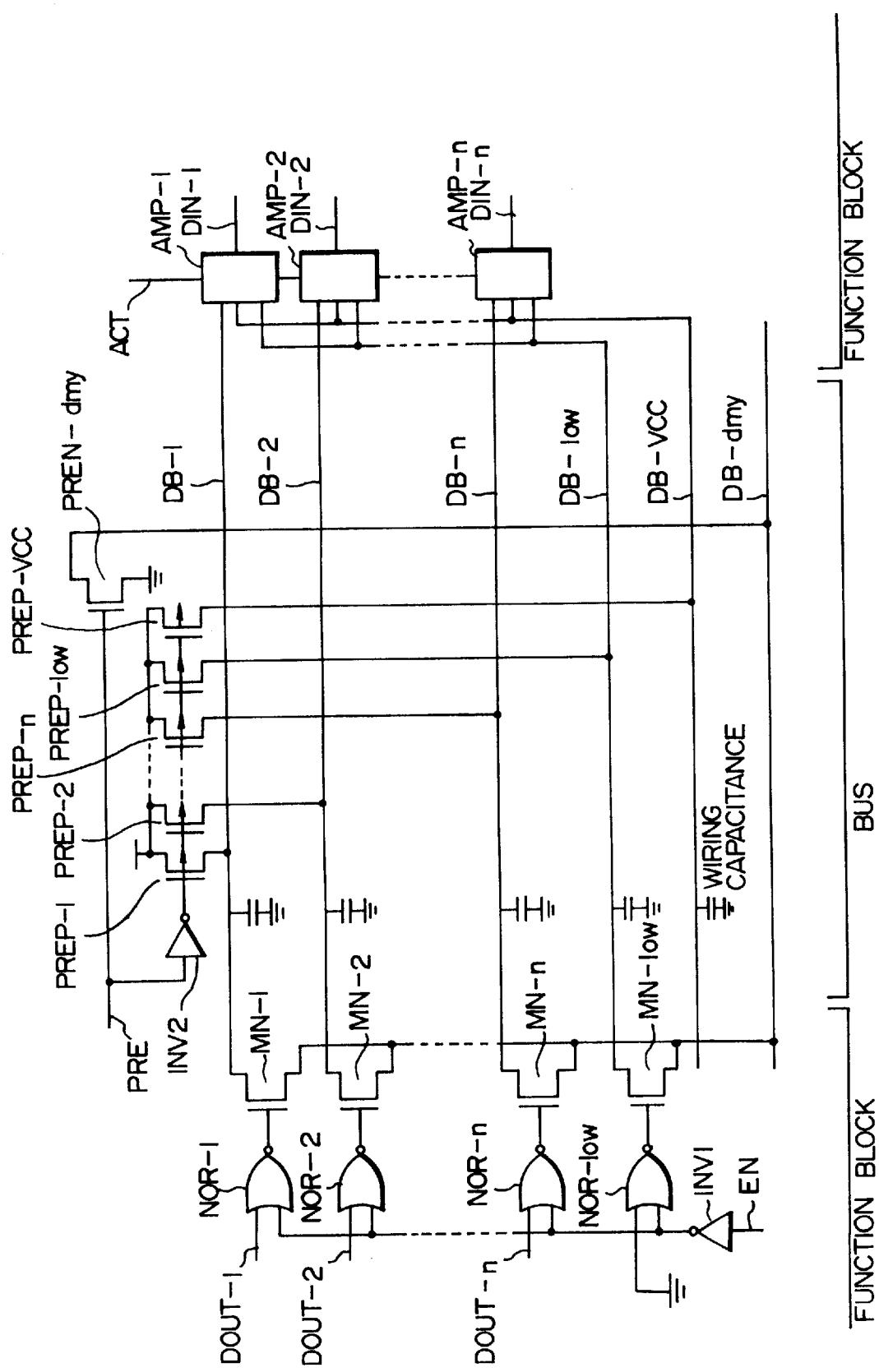
FIG. 8 is a circuit diagram showing a bus driving system according to yet another embodiment of the present invention.

FIG. 8 shows a bus driving system according to yet another embodiment of the present invention. This driver circuit differs from that shown in FIG. 1A in that one bus wire DB-VCC is additionally provided. The bus wire DB-VCC is precharged to the supply voltage VCC via the p-channel MOSFET PREP-VCC and made use of as one of the input signal lines for the amplifiers AMP-i (i=1, 2, . . . , n). (In the case of the bus driving system shown in FIG. 1A, the supply voltage VCC shown within the function block B is used as the input signal.) With the arrangement shown in FIG. 8, there can be obtained an advantage that noise of same phase induced in the bus wires DB-i, VCC, DB-low can completely be eliminated through differential operation of the amplifier AMP-i since the three input signals to the amplifier AMP-i are supplied through the bus wires DB-i, VCC and DB-low even though the area occupied by the bus wires increases because of addition of the one bus wire.

Incidentally, it is self-explanatory that a bus driver can be implemented by a combination of the bus driver circuit according to the instant embodiment with that of FIG. 5 or FIGS. 6A and 6B.

Figure 9:
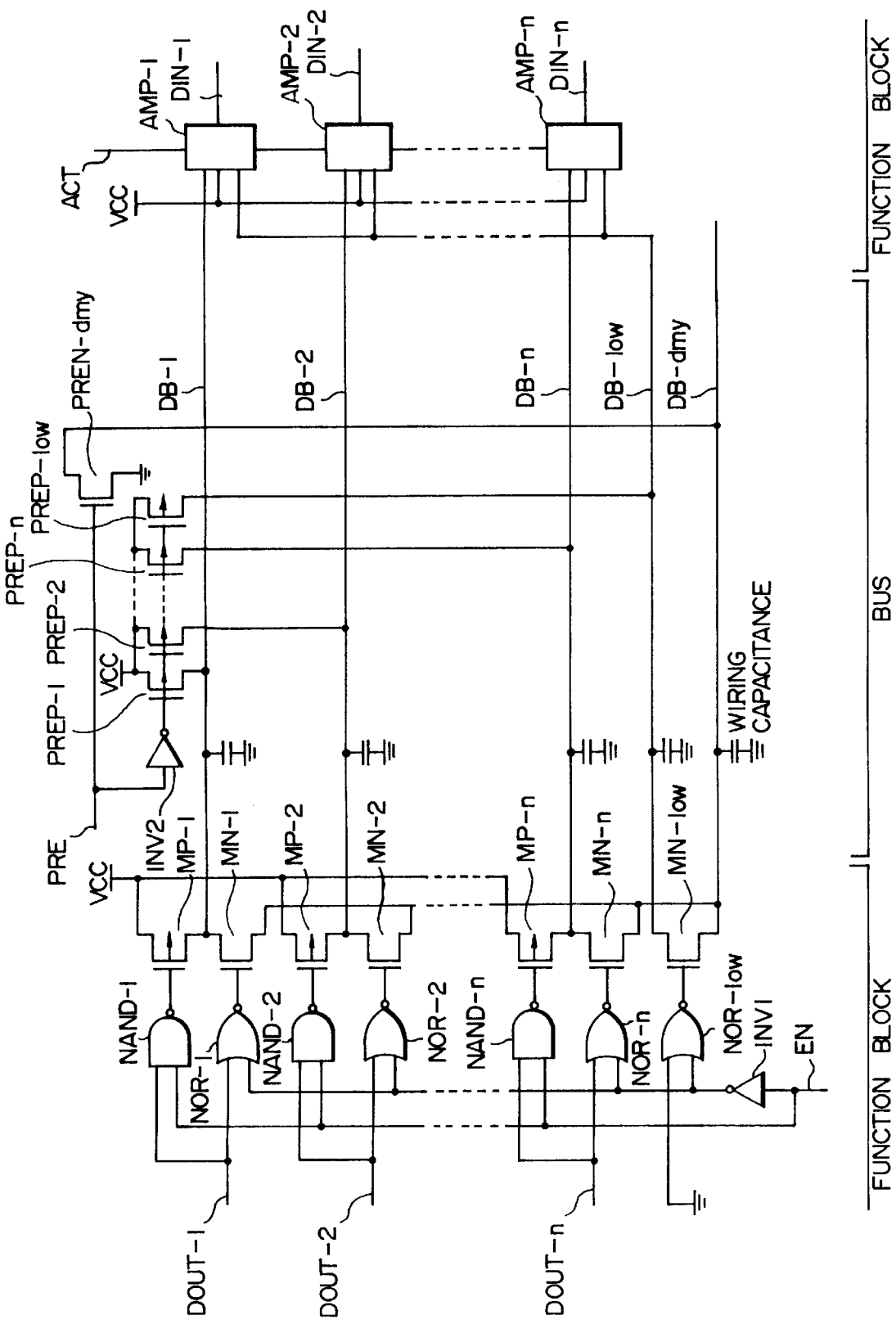
FIG. 9 is a circuit diagram showing a configuration of the bus driving system according to still another embodiment of the present invention.

FIG. 9 shows a bus driving system according to yet another embodiment of the invention.

In general, capacitance exists between neighboring bus wires (hereinafter also referred to as the inter-wire capacitance). When a large inter-wire capacitance exists between the neighboring bus wires, change or variation in the potential at one bus wire may unwantedly make appearance in the other bus wire as noise via the inter-wire capacitance. With the driver circuit according to the instant embodiment, it is contemplated to avoid the noise ascribable to the inter-wire capacitance.

As can be seen in FIG. 9, the bus driving system according to the instant embodiment differs from that shown in FIG. 1A in that a switching circuit composed of a p-channel FET MP-i and a NAND gate NAND-i is additionally provided for controlling conduction (ON)/non-conduction (OFF) between the bus wires DB-i (i=1, 2, . . . , n) and the power source VCC. Referring to FIG. 9, when a signal of high level VCC or low level V-low appears on the bus wires DB-1, DB-2, . . . , DB-n in response to the control signal EN of high level, the switching circuit serves to establish electrical conduction between the bus wire on which the high level VCC makes appearance and the power source VCC, to thereby ensure for that bus wire a same potential level as that of the power source VCC. By way of example, when the bus wire DB-1 assumes high level in response to the control signal EN of the high level VCC, this means that a bit signal DOUT-1 outputted from a function block A must equally be at the high level VCC. Consequently, the output of the NAND gate NAND-1 is low, which results in conduction of the p-channel MOSFET MP-1. Let's suppose that in this state, a signal of a low level makes appearance on the other bus wire (e.g. DB-2). In that case, the potential at the bus wire DB-1 tends to be lowered under the influence of the low level on the bus wire DB-2 through the medium of the inter-wire capacitance. However, because the potential of the bus wire DB-1 is positively fixed to the supply voltage VCC via the p-channel MOSFET MP-1, the bus wire DB-1 can be protected against the influence of the potential change of the bus wire DB-2.

Figure 10A:
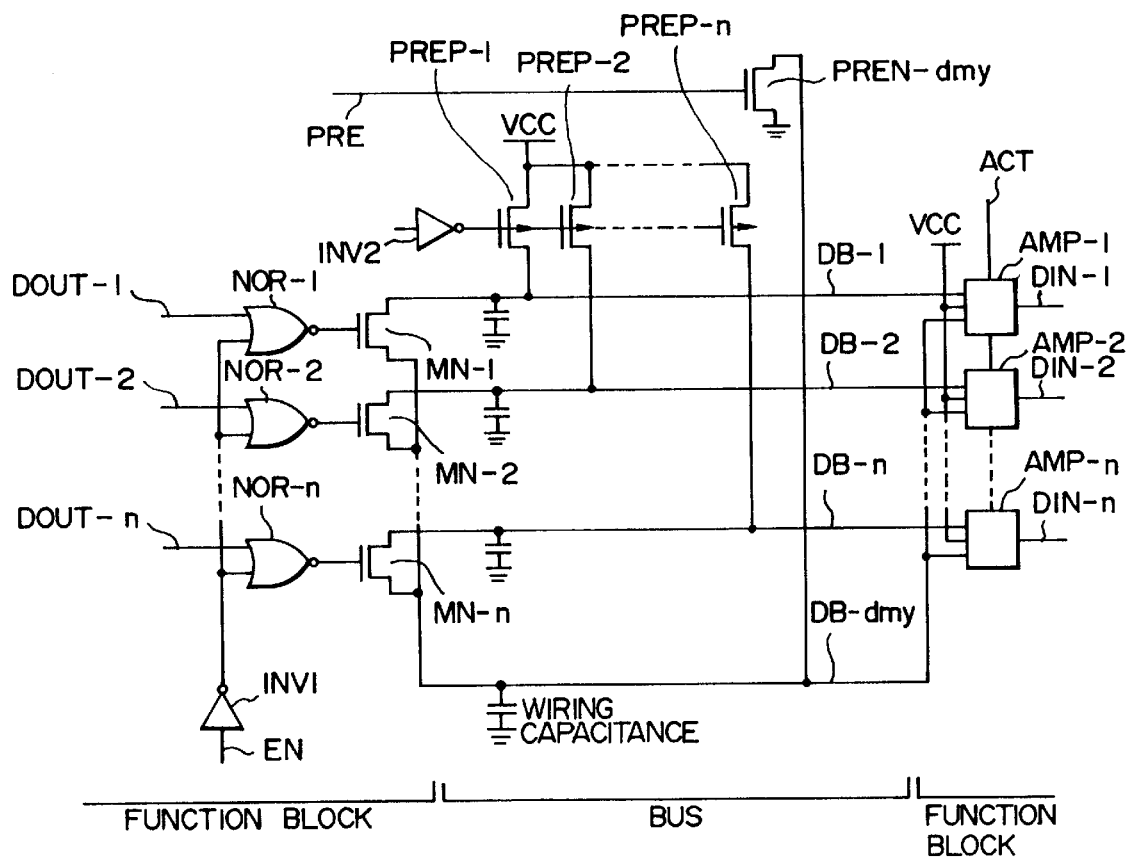
FIG. 10A is a circuit diagram showing a bus driving system according to a further embodiment of the present invention.
Figure 10B:
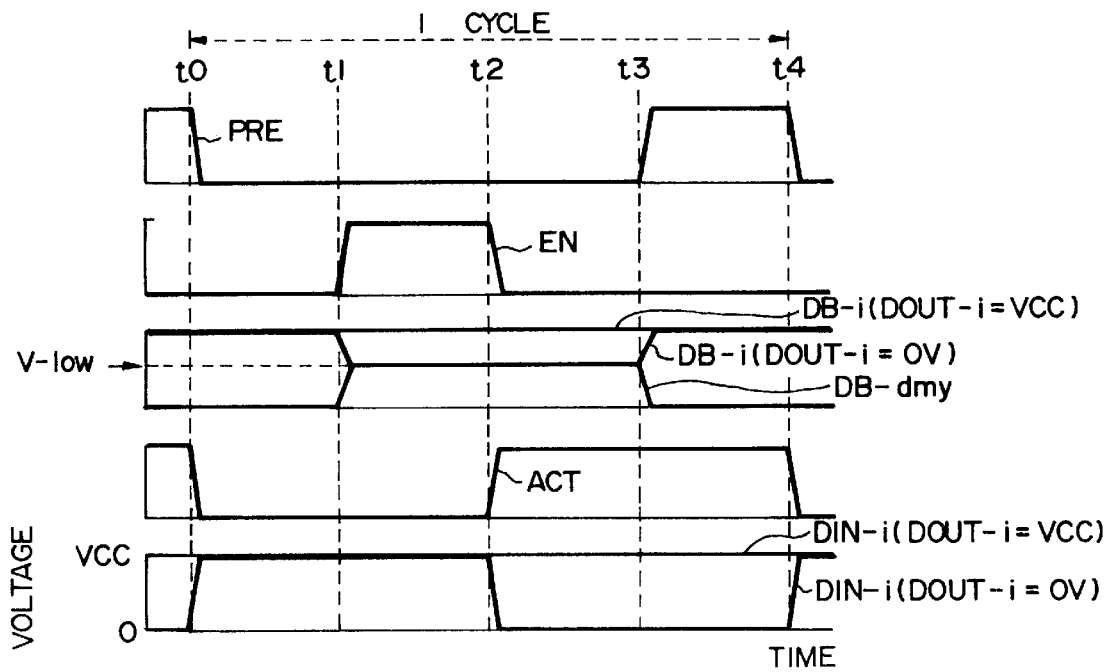
FIG. 10B is a timing chart for illustrating operation of the same.

FIG. 10A shows a bus driving system according to a further embodiment of the present invention. This bus driver system features that the number of the bus wires is decreased by one when compared with the typical or representative embodiment of the bus driving system such as shown in FIG. 1A. More specifically, the bus wire DB-low provided in the bus driving systems according to the other embodiments is spared in the driver according to the instant embodiment, and the function of the former is performed by the bus wire DB-dmy by taking advantage of the fact that the signal of low level V-low of the bus wire DB-i (i=1, 2, . . . , n) appearing on the bus wire DB-low also makes appearance on the bus wire DB-dmy only during the period from the time point t1 to t3 (refer to FIG. 10B). It should however be noted that a time will be taken more or less for setting the signal level of the bus wire DB-dmy so as to coincide with the low level V-low. Accordingly, the bus driving system of the instant embodiment is not suited for employment in such applications where operation of a very high speed is required.

Figure 4A:
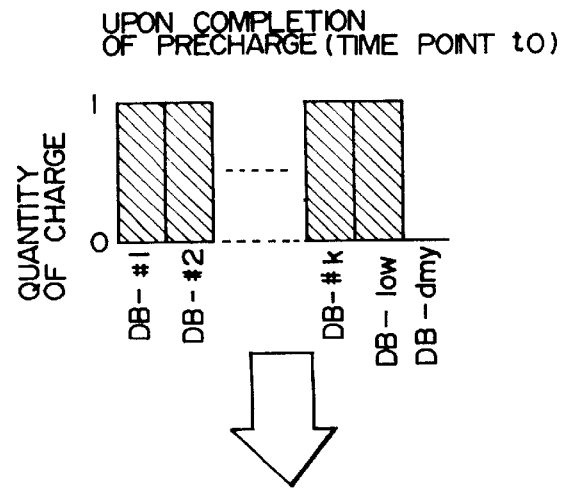
FIG. 4A is a view for illustrating reduction of power consumption which can be achieved with the bus driving system according to the present invention.
Figure 4B:
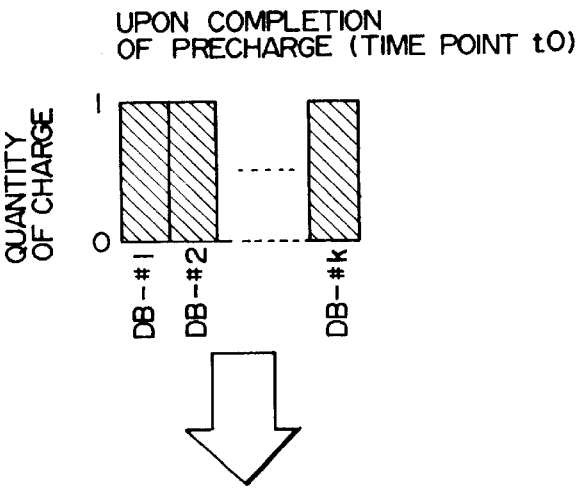
FIG. 4B is a view for illustrating power consumption in a bus driving system known heretofore.
Figure 4B:
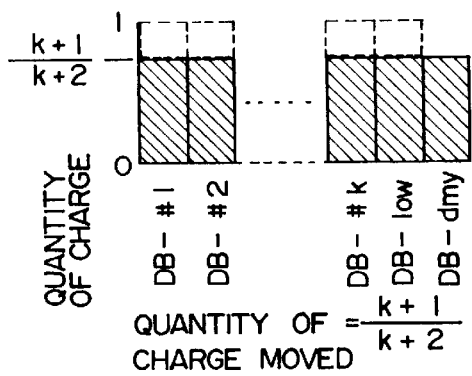
Figure 4B:
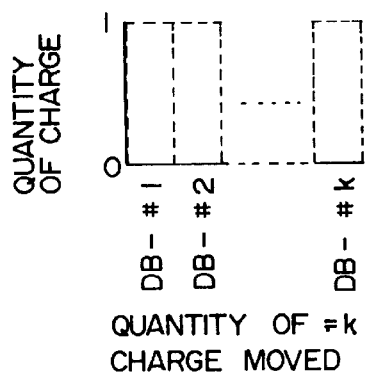
Figure 11A:
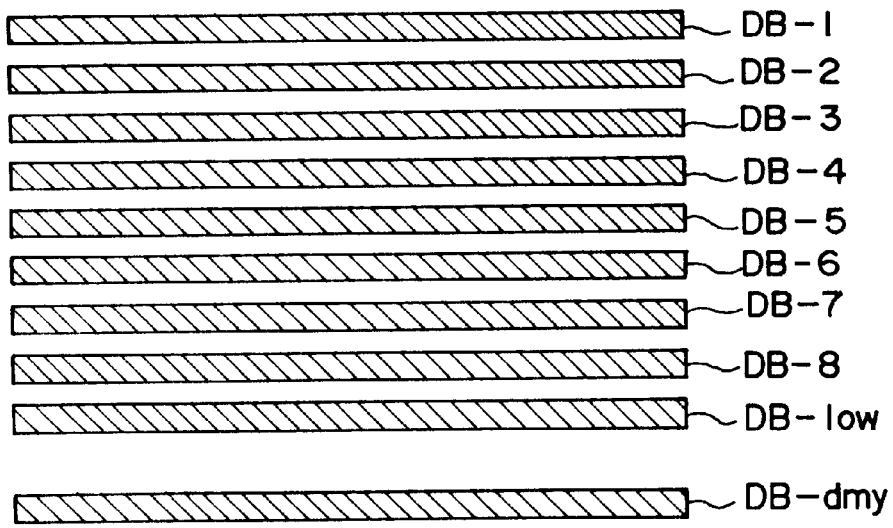
FIG. 11A is a view showing a bus wire layout pattern according to an embodiment of the present invention.
Figure 11B:
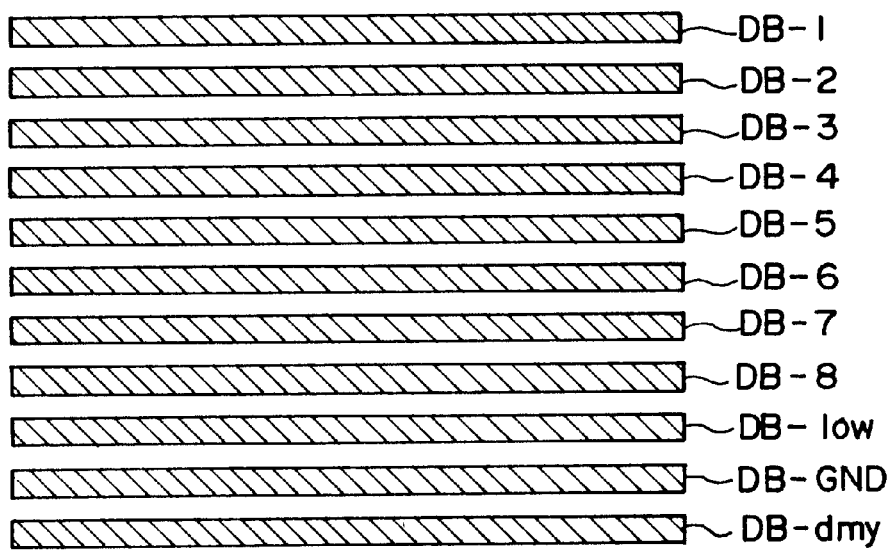
FIG. 11B is a view showing another example of bus wire layout pattern according to yet another embodiment of the present invention.

FIGS. 11A and 11B show exemplary layout patterns of the bus wires according to the invention. In the bus arrangement taught by the invention, it is desirable that the bus wire DB-dmy be distanced from the other bus wires DB-1, DB-2, . . . , DB-n, DB-low as far as possible. This is because the voltage swing of the signal on the bus wire DB-dmy is large when compared with that of the other bus wires DB-1, DB-2, . . . , DB-n, DB-low, as can be seen in FIG. 4A where the voltage swing occurring on the bus wire DB-dmy is always greater than VCC/2, while the voltage swing on the other bus wires DB-1, DB-2, . . . , DB-n, DB-low can never exceed VCC/2, and thus the voltage change on the bus wire DB-dmy may bring about variation in the potential of the other bus wires through the inter-wire capacitance.

FIG. 11A shows a bus wire layout pattern in which only the bus wire DB-dmy is wired at a greater distance from the other bus wires DB-1, DB-2, . . . , DB-n, DB-low than the wiring pitch thereof. FIG. 11B shows another example of bus wire layout in which a bus wire DB-GND fixed to the ground potential GND is inserted between the bus wire DB-dmy and the other bus wires DB-1, DB-2, . . . , DB-n, DB-low. With this arrangement, the electric field emanated from the bus wire DB-dmy can effectively be shielded. At this juncture, it should be mentioned that the potential of the bus wire DB-GND need not necessarily be the ground potential 0V but may be fixed at a constant potential level.

Figure 12A:
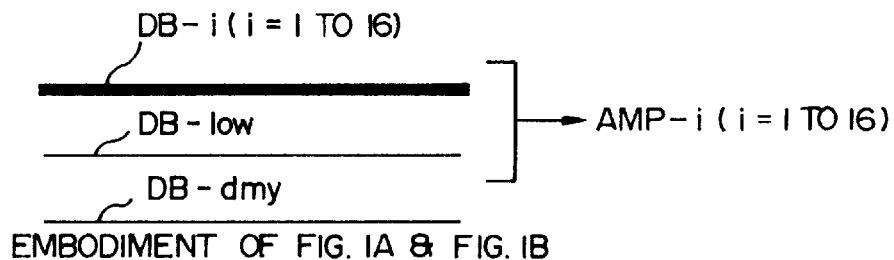
FIG. 12A is a schematic diagram showing a bus wire array according to an embodiment of the present invention.
Figure 12B:
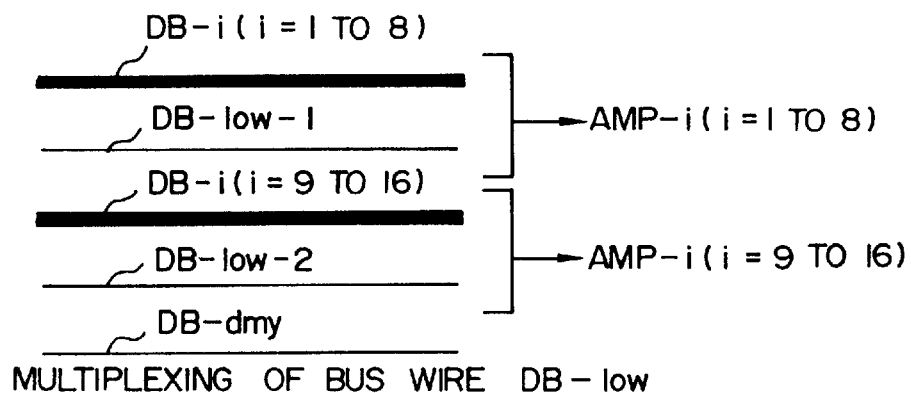
FIG. 12B is a view similar to FIG. 12A and shows a bus wire array according to yet another embodiment of the present invention.
Figure 12C:
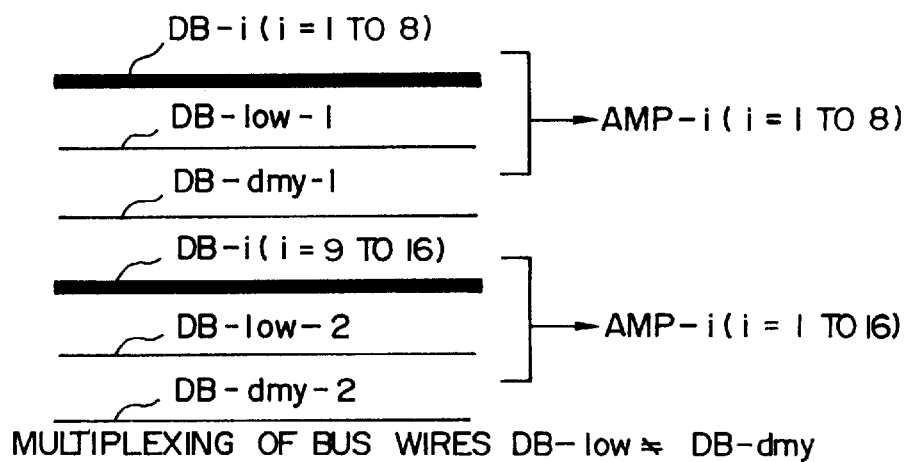
FIG. 12C is a view similar to FIG. 12A and shows a bus wire array according to still another embodiment of the present invention.

FIGS. 12B and 12C show bus wire structures according to further embodiment of the invention, and FIG. 12A shows a bus wire structure corresponding to the embodiment of FIGS. 1A and 1B for the comparison purpose on the assumption that 16-bit data are to be handled.

In the bus structure shown in FIG. 12A, the bus wire DB-i is connected to only one amplifier AMP-i per one function block, while the bus wire DB-low is connected to sixteen amplifiers AMP-i (where i=1 to 16). Consequently, the bus wire DB-low has wiring capacitance increased correspondingly as compared with that of the bus wires DB-i. Besides, gate capacitance of the amplifier to which the bus wire DB-low is connected may become dominant over the wiring capacitance thereof. In that case, difference in capacitance between the bus wire DB-low and the bus wires DB-i increases correspondingly, which is of course undesirable for realizing bus operation satisfactory. For solving this problem, the bus wire DB-low is multiplexed or divided into bus wires DB-low-1 and DB-low-2, wherein the amplifiers AMP-i (where i=1 to 8) are allocated to the bus wire DB-low-1 with the amplifiers AMP-i (where i=9 to 16) being allocated to the bus wire DB-low-2, as shown in FIG. 12B. With this arrangement, it is possible to reduce the aforementioned difference in capacitance although the area occupied by the bus wiring increases. In the case of the example shown in FIG. 12B, the bus wire DB-low is multiplexed into two bus wires DB-low-1 and DB-low-2. It should however be understood that the bus wire DB-low can be divided into more than two wires.

In the bus driving system which the invention concerns, the signals appearing on the bus wires DB-i have a small amplitude. Accordingly, in designing and implementing the bus driving system, careful attention should be paid so that no erroneous operation occurs under the influence of noise. With the arrangement shown in FIG. 12C, it is intended to cope with this problem. Referring to the figure, the bus wire DB-low and the bus wire DB-dmy are multiplexed into bus wires DB-low-1 and DB-low-2 and bus wires DB-low-1 and DB-low-2, respectively. Through combination of two pairs of bus wires each for handling 8-bit data in this manner, it is possible to increase the amplitude (swing) of signals appearing on the bus wire DB-i. Although the bus wire DB-low and the bus wire DB-dmy are each divided into two bus wires DB-low-1, DB-low-2 and DB-dmy-1, DB-dmy-2, respectively, in the case of the illustrated embodiment, it goes without saying that they can be divided into more than two bus wires, respectively.

Figure 13:
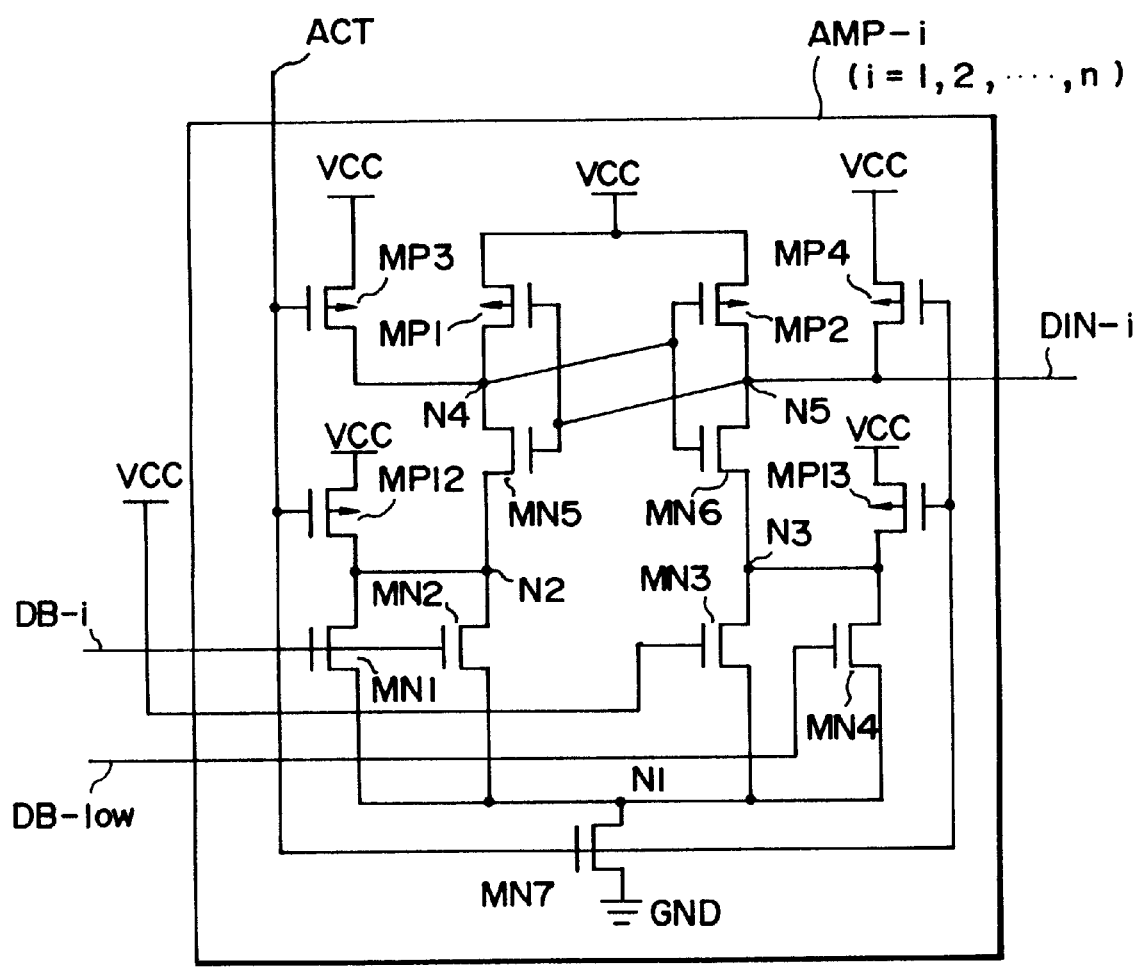
FIG. 13 is a circuit diagram showing a circuit configuration of another embodiment of the differential amplifier circuit which can be employed in the bus driving system according to the present invention.

FIG. 13 shows a circuit configuration of a differential amplifier circuit employed in the bus driving system (FIG. 1A) according to the invention. This differential amplifier differs from that shown in FIG. 2 in that p-channel MOSFETs MP-12 and MP-13 are additionally provided. When the circuit is not activated, i.e., when the activation signal ACT is at the low level 0V, the p-channel MOSFETs MP-12 and MP-13 cooperate to cause the nodes N2 and N3 to assume a same potential (i.e., potential equal to the supply voltage VCC), whereby the differential amplification operation of the circuit can be much stabilized.

Figure 14:
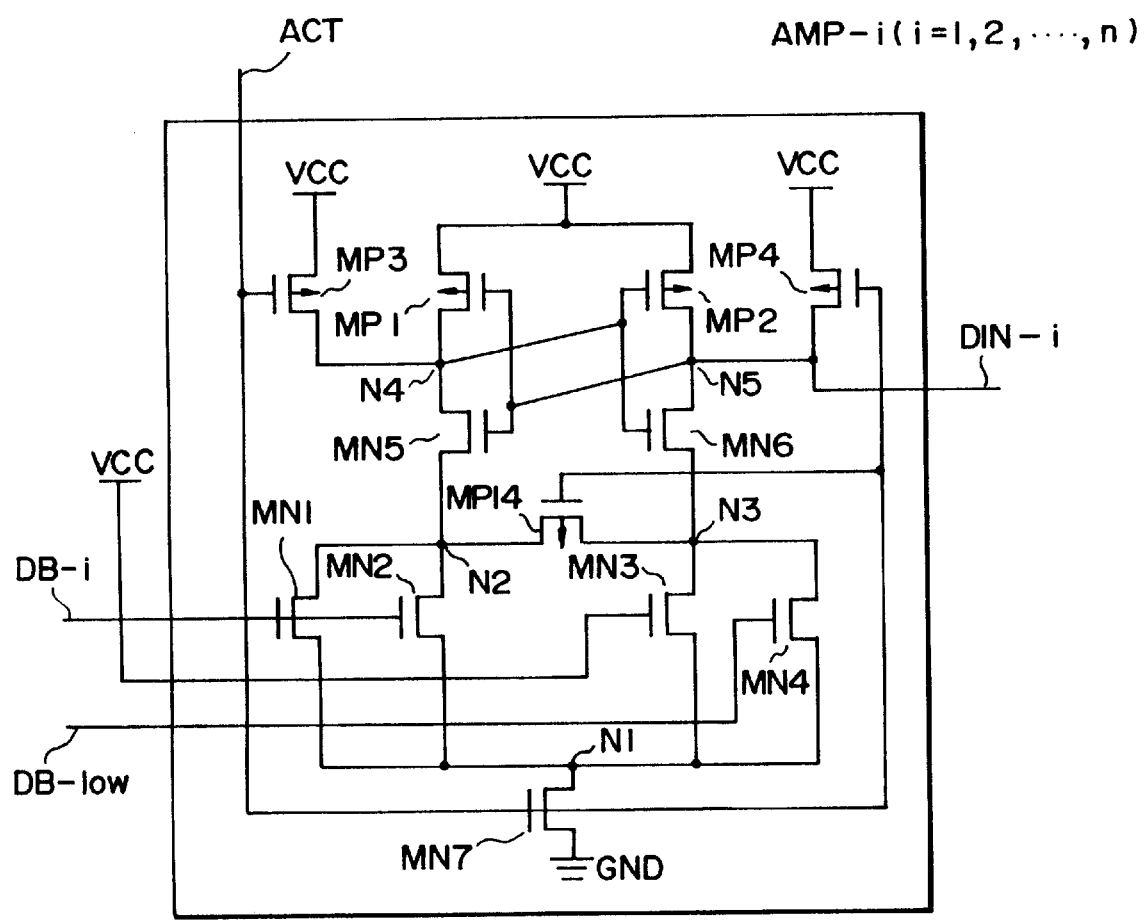
FIG. 14 is a view similar to FIG. 13 and shows another circuit configuration of the differential amplifier which can be employed in the bus driving system according to the present invention.

FIG. 14 shows another circuit configuration of the differential amplifier employed in the bus driving system (FIG. 1A) according to the present invention. The instant differential amplifier differs from that shown in FIG. 2 in that a p-channel MOSFET MP-14 is additionally provided. By virtue of the provision of the p-channel MOSFET MP-14 which serves for ensuring that a same potential appears at the nodes N2 and N3 when the circuit is not activated, i.e., when the activation signal ACT is at the low level 0V, the differential amplification effected by the circuit can be much stabilized.

Figure 15A:
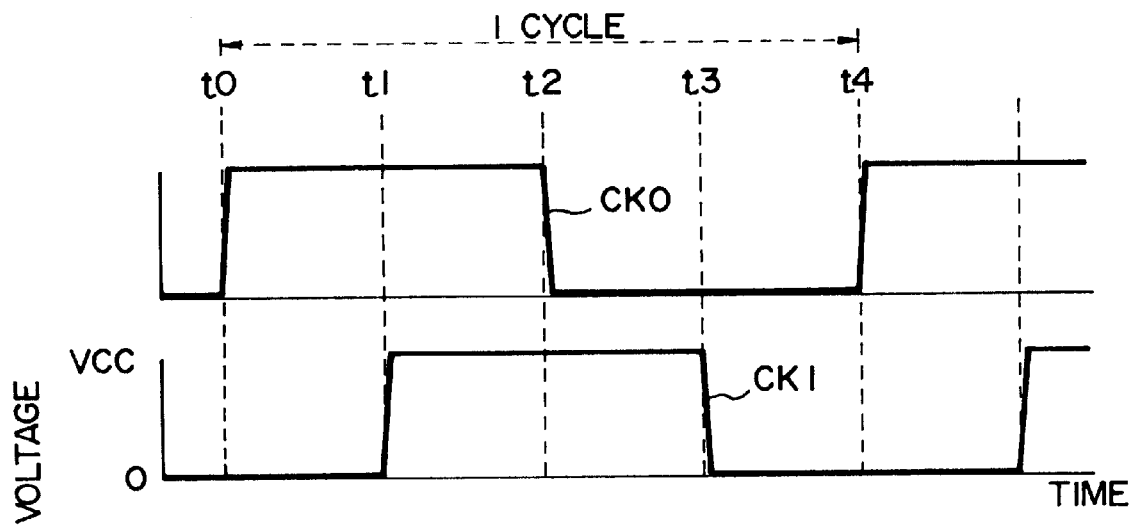
FIG. 15A is a timing chart showing waveforms of signals used in the bus driving system according to an embodiment of the invention.
Figure 15B:
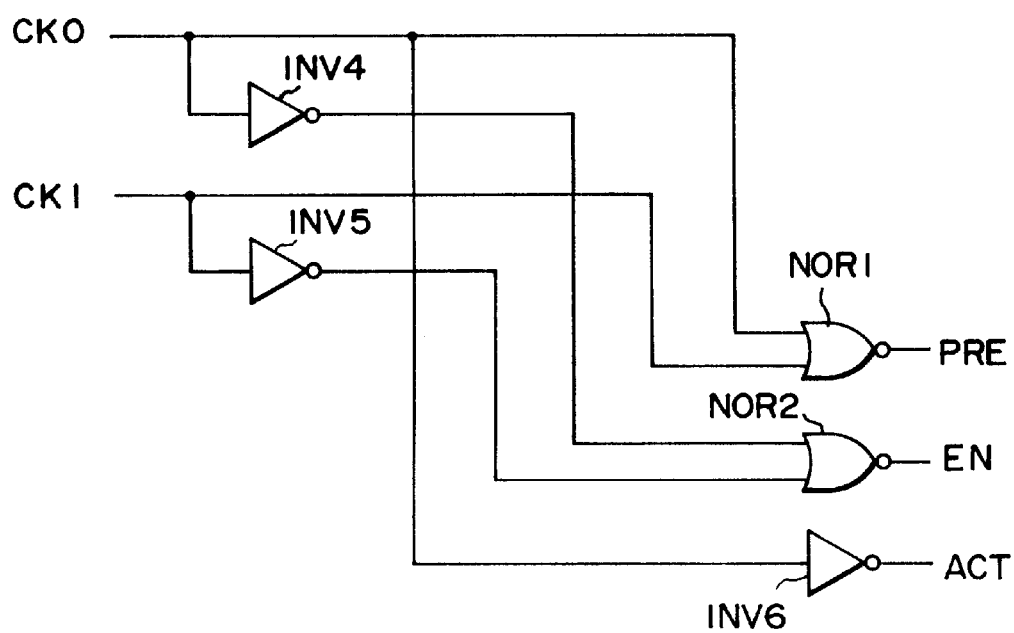
FIG. 15B is a circuit diagram showing a circuit configuration for generating the signals shown in FIG. 15A.

FIGS. 15A and 15B are signal waveform diagrams for illustrating a method of generating the various control signals PRE, EN and ACT from clocks CK0 and CK1. In the case of the instant embodiment, overlapping clocks of two phases are presumed. It should however be understood that the control signals of concern can easily be generated on the basis of other types of clocks such as clocks of two phases not overlapping each other or clock of one phase through similar procedure.

Figure 16A:
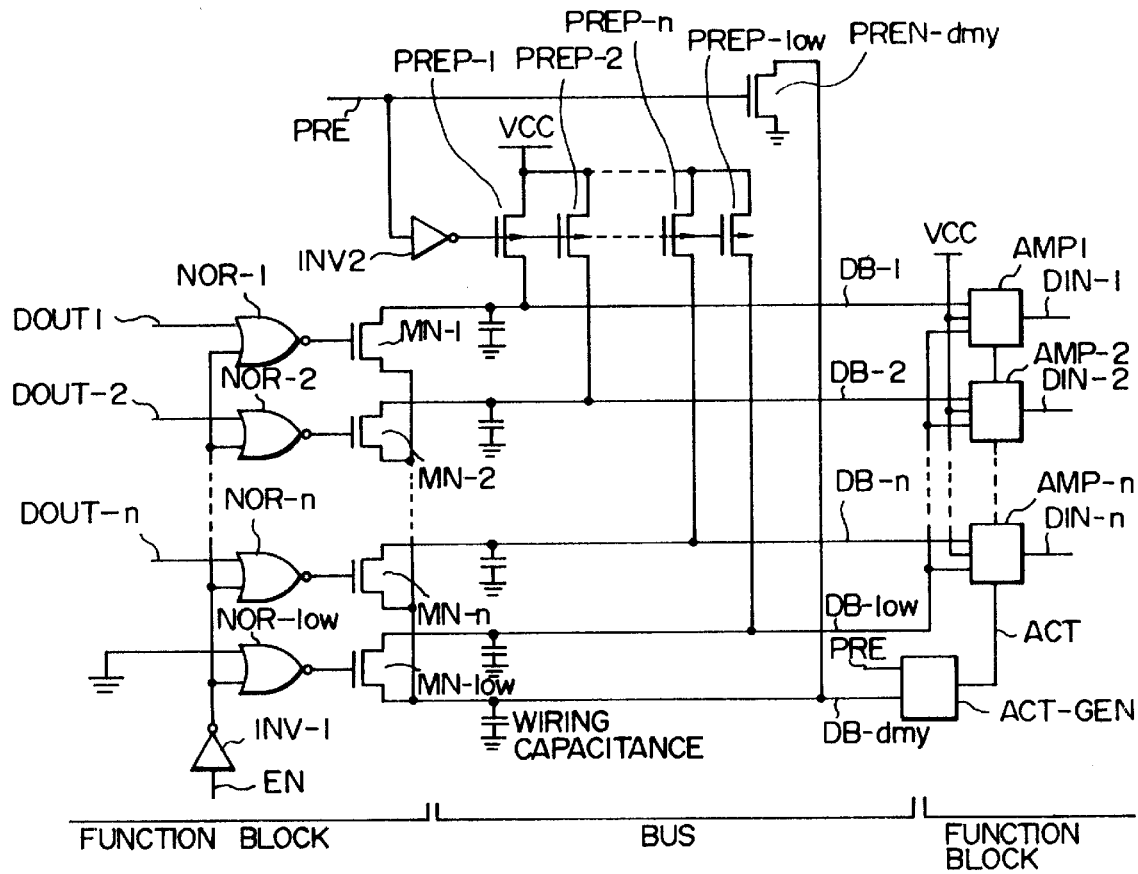
FIG. 16A is a circuit diagram showing another embodiment of the bus driving system according to the invention.

FIG. 16A is a circuit diagram showing another embodiment of the bus driving system according to the invention. This bus driving system features such arrangement that arrival of data is detected in a function block B destined for receiving the data to thereby generate the activation signal ACT.

Figure 16B:
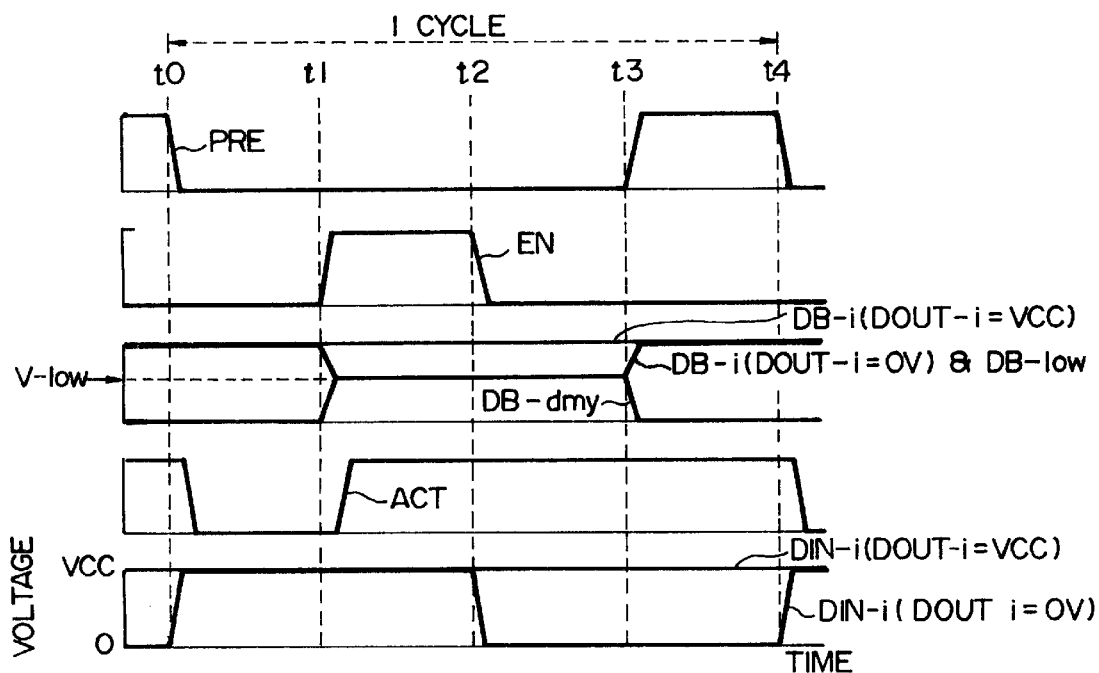
FIG. 16B is a timing chart for illustrating operation of the same.
Figure 17:
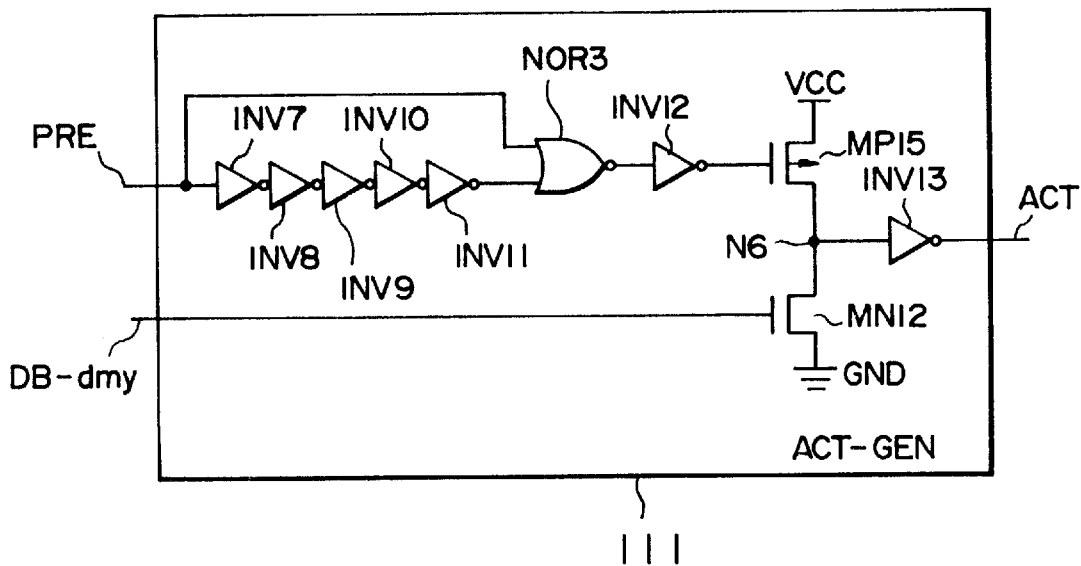
FIG. 17 is a circuit diagram showing a circuit configuration for generating a control signal employed in the bus driving system according to an embodiment of the invention.

More specifically, upon arrival of the bit signals at the data receiving function block B via the bus wires DB-1, DB-2, . . . , DB-n and DB-low, the potential on the bus wire DB-dmy undergoes a change. In that case, since the voltage swing taking place at the bus wire DB-dmy is greater than VCC/2 inclusive thereof (refer to FIG. 4A), the change in the potential of the bus wire DB-dmy can be detected without any difficulty. A detection circuit ACT-GEN which is incorporated in the function block B and configuration of which is shown in FIG. 17 detects rise-up of the potential on the bus wire DB-dmy at a time point t1 to thereby generate the activation signal ACT. Subsequently, at a time point t4, the activation signal detection circuit (ACT-GEN) 111 detects the fall of the precharge signal PRE to thereby reset the activation signal ACT, whereby the activation signal ACT-GEN is made to be available for the succeeding operation cycle (FIG. 16B).

FIG. 17 shows a circuit configuration of the activation signal detection circuit ACT-GEN employed in the bus driving system shown in FIG. 16A. Operation of thus circuit ACT-GEN will be described below.

The activation signal detection circuit ACT-GEN according to the instant embodiment of the invention is provided with two inputs PRE and DB-dmy and one output ACT. When the potential at the input DB-dmy rises up beyond the level V-low (not lower than VCC/2), the n-channel MOSFET MN-12 is switched on, which results in lowering of the potential at the node N6 to the ground potential 0V with the activation signal ACT assuming the supply voltage level VCC. When the input DB-dmy becomes 0V at a time point t3, the n-channel MOSFET MN-12 is switched off (i.e., to the nonconducting state). When the input PRE changes from the supply voltage level VCC to the ground potential 0V at a time point t4, the p-channel MOSFET MP-15 is switched on during a period which corresponds to a delay time of five stages of inverters INV6, INV7, INV8, INV9 and INV10, whereby the potential at the node N6 is pulled up to the supply voltage level VCC while the activation signal ACT is reset to the ground potential 0V to be ready for the succeeding operation cycle. The time duration or period during which the p-channel MOSFET MP-15 continues to be conducting can be regulated by adjusting the number of stages of the inverters INV6 to INV10 which are provided in an odd number of stages.

Figure 18:
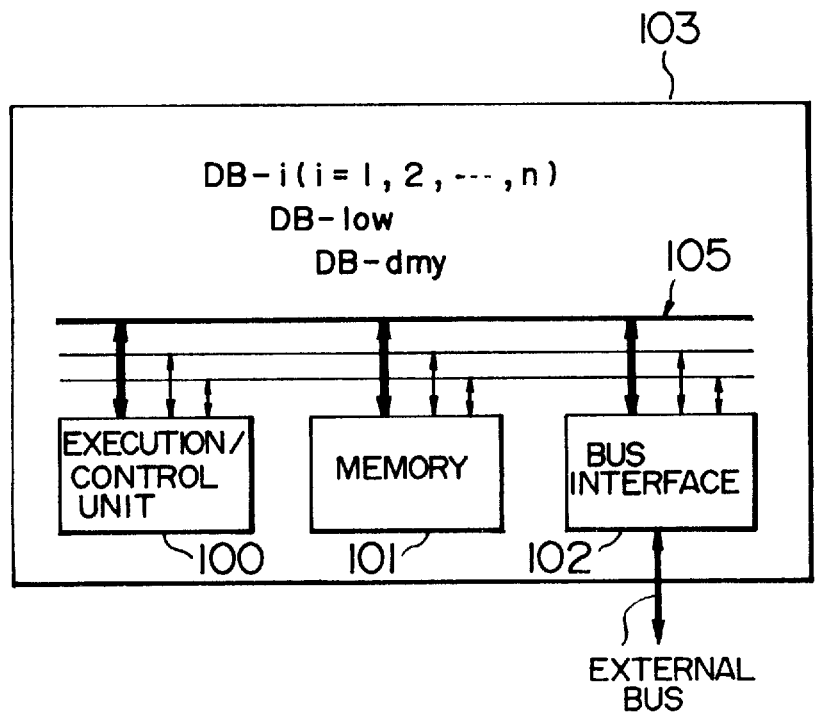
FIG. 18 is a block diagram showing a structure of a microprocessor incorporating an internal bus system to which a bus structure according to the present invention can be applied.

FIG. 18 is a block diagram showing a structure of a microprocessor incorporating an internal bus to which a bus structure according to the invention is applied. In general, the microprocessor 103 includes an execution/control unit 100, a memory 101 and a bus interface 102 which are interconnected by an internal bus 105. By applying the bus driving system according to the invention to the internal bus 105, the chip power dissipation or consumption of the microprocessor 103 can effectively be reduced.

Figure 19:
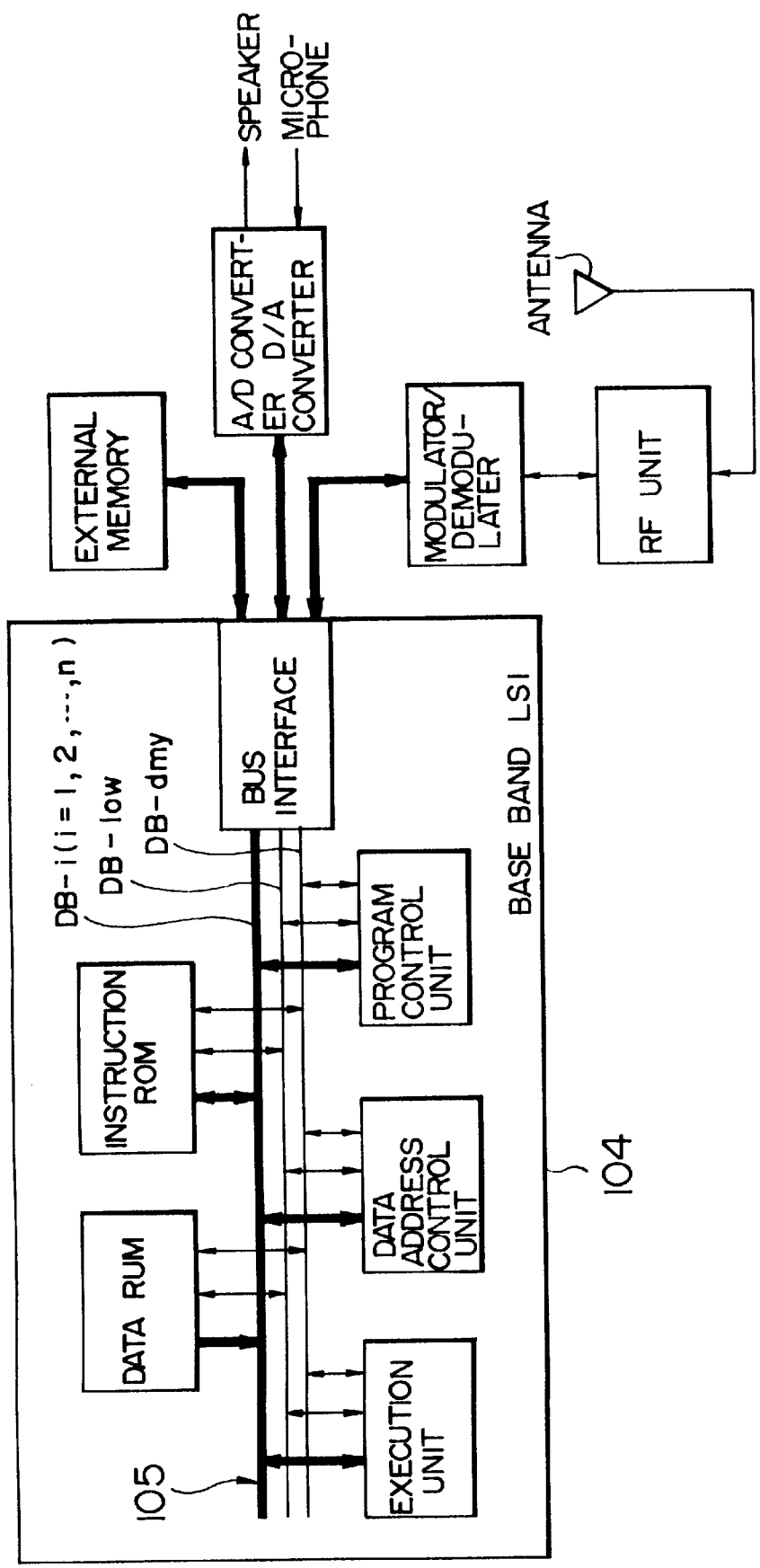
FIG. 19 is a block diagram showing a system configuration of a digital type portable telephone in which a bus driving system according to an embodiment of the present invention can be applied.

FIG. 19 shows a system configuration of a digital type portable telephone according to still another embodiment of the invention. Referring to the figure, a base band LSI 104 is in charge of executing digital processings which involve a large number of operations such as coding/decoding of digitalized speech, assembling/disassembling of frames and the like. By applying the bus driving system according to the invention to the internal bus 105 of the base band LSI 104, power dissipation or consumption of the LSI 104 can be reduced, which in turn means that a potable telephone enjoying an extended use life of a cell or battery can be realized. The base band LSI 104 may be of a conventional structure known in the art. Accordingly, any further description will be unnecessary, being understood that the structure of the LSI 104 is self-explanatory from FIG. 19.

Figure 20:
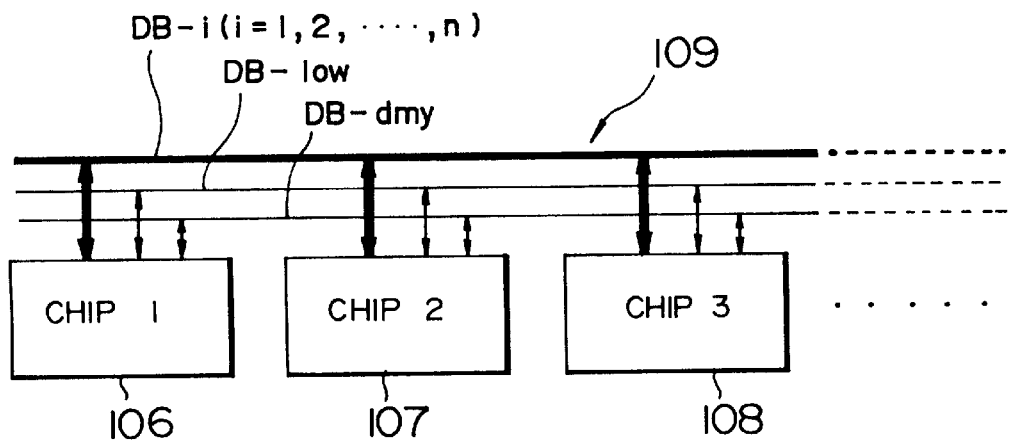
FIG. 20 is a circuit diagram illustrating a bus driving system according to yet another embodiment of the present invention which is applied to an external bus system for interconnecting a plurality of chips mounted on a package board.

FIG. 20 is a circuit diagram illustrating yet another embodiment of the invention which is applied to an external bus 109 for interconnecting a plurality of chips mounted on a package board. By applying the bus structure taught by the invention to the external bus in this way, the power consumption or dissipation of the whole system can effectively be reduced.

Figure 21A:
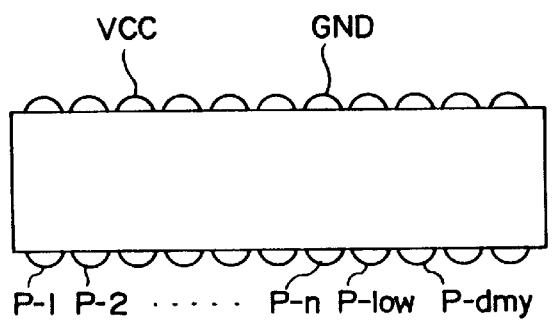
FIG. 21A is a schematic view showing a pin arrangement in an IC package to which a bus driving system according to the present invention can be applied.
Figure 21B:
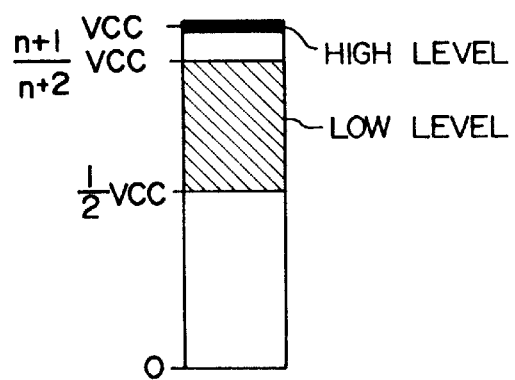
FIG. 21B is a view for illustrating signal levels at an input/output port in the device shown in FIG. 21A.

FIG. 21A shows an exemplary pin arrangement in each of chips 106, 107 and 108 employed in the embodiment shown in FIG. 20. The signal pins in each of the chips 106, 107 and 108 include pins P-1, P-2, . . . , P-n, P-low and P-dmy connected to an external bus to which the bus structure according to the invention is applied. Of the input/output levels at the signal pins P-1, P-2, . . . , P-n, P-low, the high level coincides with the supply voltage level VCC, while the low level assumes a level higher than VCC/2 and lower than the level given by (N+1)VCC/(N+2). In this conjunction, it should be noted that the low potential level may differ from one to another operation cycle (refer to FIG. 21B).

Figure 22:
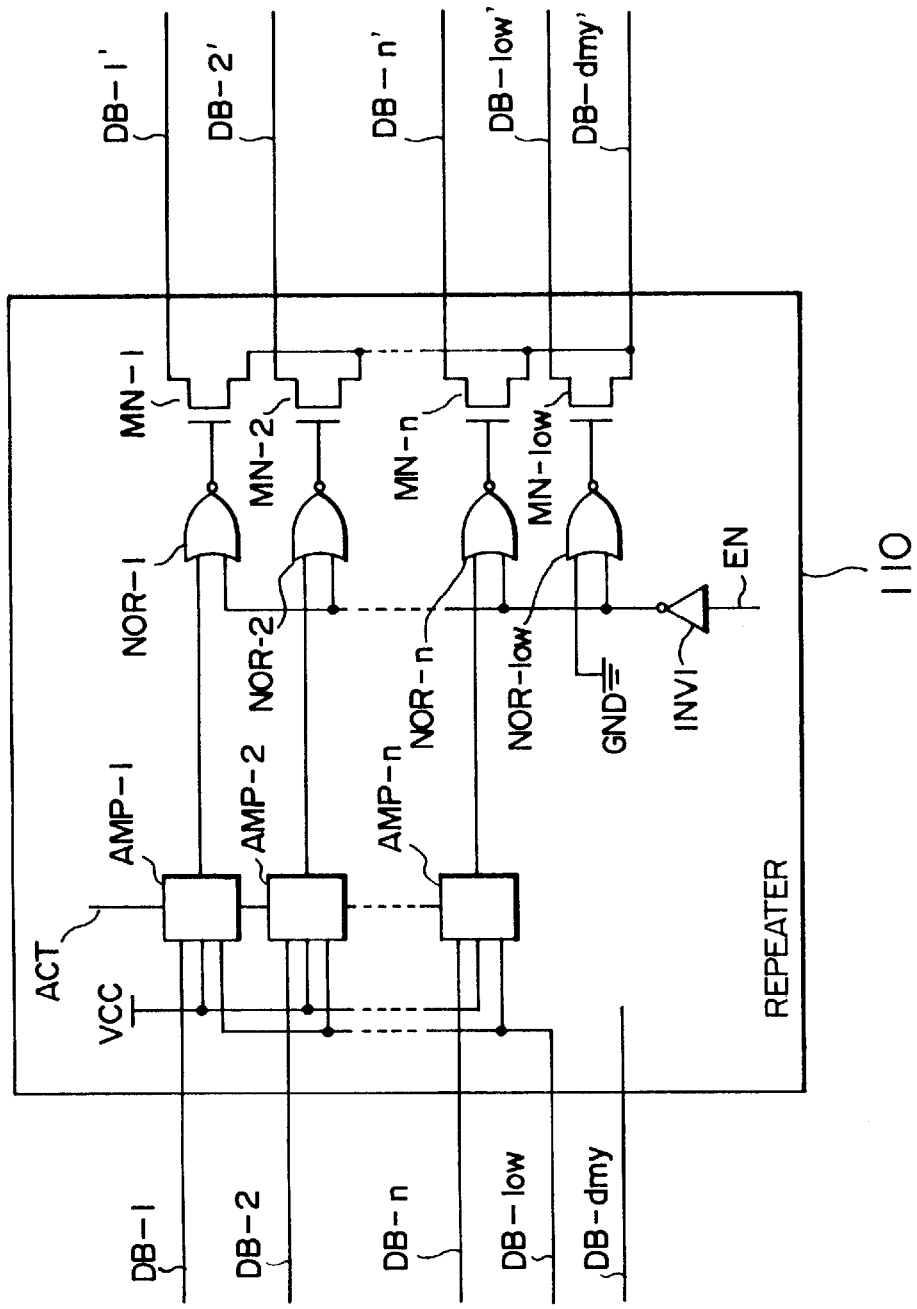
FIG. 22 is a circuit diagram showing a repeater circuit provided in bus wires of a bus system according to a further embodiment of the present invention.

FIG. 22 is a circuit diagram showing a further embodiment of the present invention. In the case where the bus wires have a great length, signal waveform may undesirably become dull with transfer rate being lowered due to resistances of bus wires and/or wiring capacitances. To cope with this problem, a repeater 110 is provided on the way of the bus for shaping the signals in the case of the instant embodiment of the invention. The signals incoming along the bus wires DB-1, DB-2, . . . , DB-n and DB-low are amplified to full swing by amplifier circuits AMP-1, AMP-2, . . . , AMP-n in the repeater 110 and sent out onto the bus wires DB-1', DB-2', . . . , DB-n', DB-low' as the signals having an amplitude lowered from a transmitter which is composed of NOR gates NOR-1, NOR-2, . . . , NOR-n, NOR-low and the n-channel MOSFETs MN-1, MN-2, . . . , MN-n, MN-low.

Figure 23A:
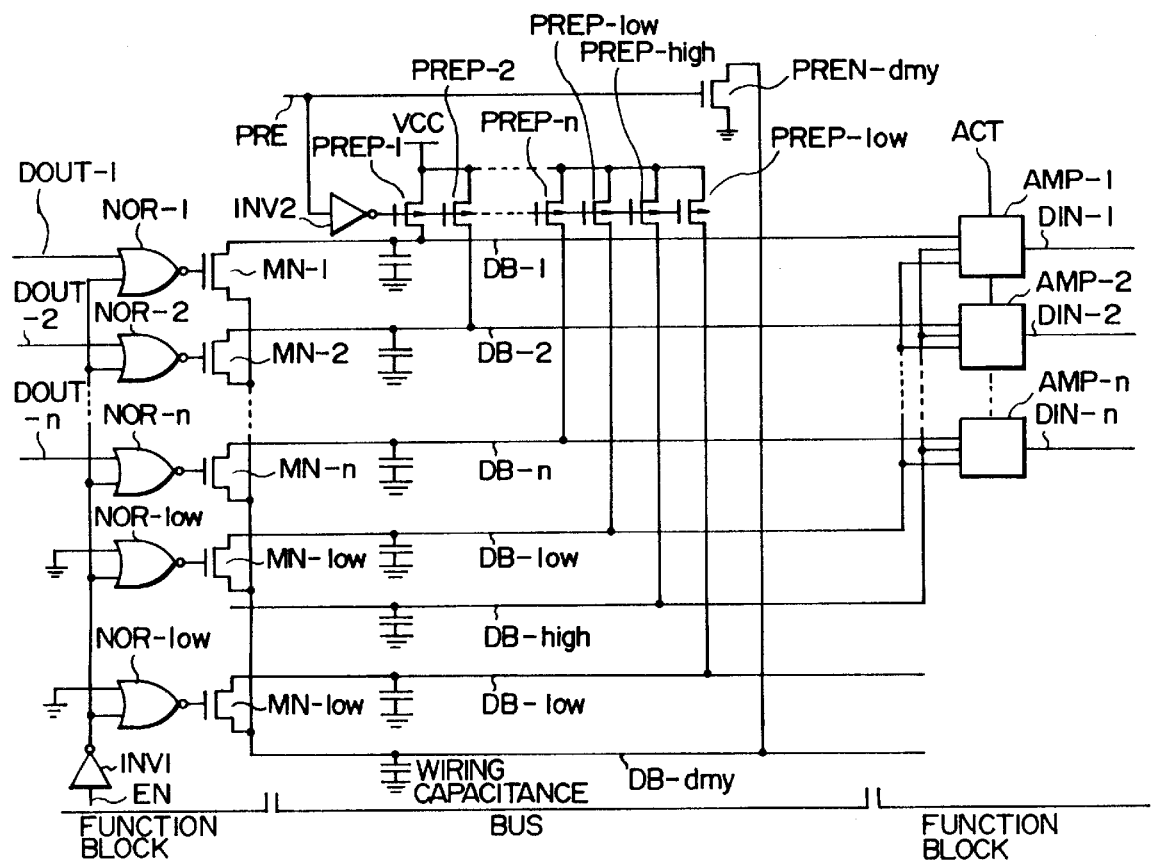
FIG. 23A is a circuit diagram showing a bus driving system according to a further embodiment of the invention.
Figure 23B:
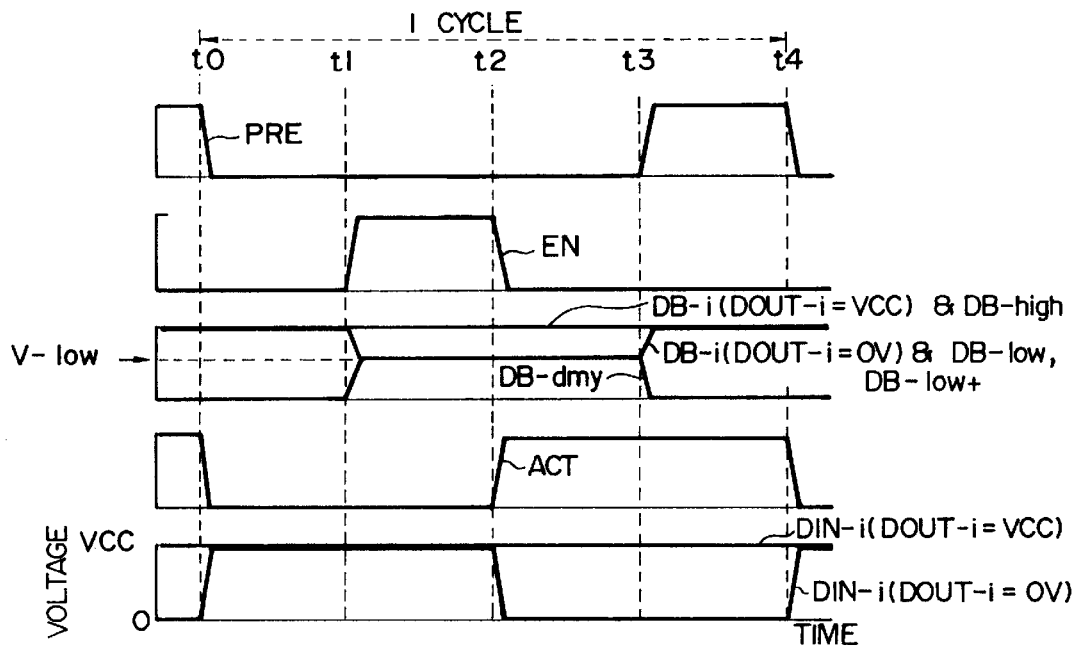
FIG. 23B is a timing chart illustrating operation of the same.
Figure 24A:
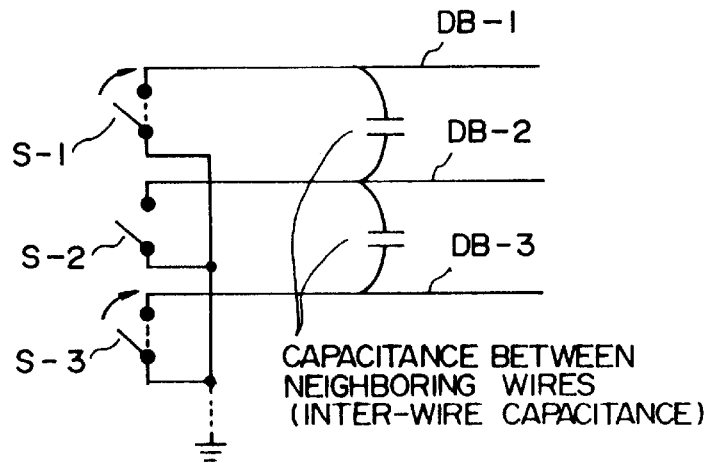
FIGS. 24A and 24B are views for illustrating a crosstalk problem which a bus driving system known heretofore suffers.
Figure 24B:
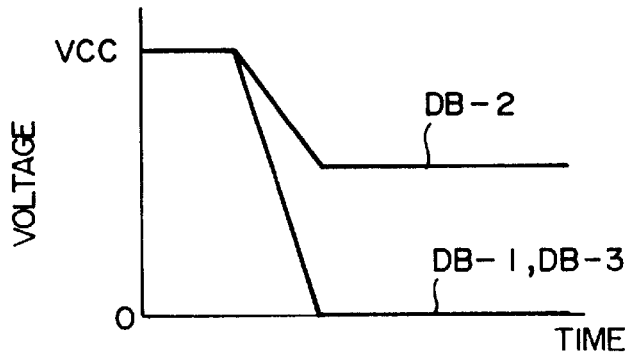

FIG. 23A is a circuit diagram showing a bus structure according to another embodiment of the invention, and FIG. 23B is a timing chart for illustrating waveforms of the signals involved in operation of the circuit shown in FIG. 23A.

Referring to the figures, it is seen that at a time point t0, the potentials at the (n+3) bus wires DB-1, DB-2, . . . , DB-n, DB-low, DB-low+, DB-high are kept at the supply voltage level VCC by the p-channel MOSFETs PREP-1, PREP-2, . . . , PREP-n, PREP-low, PREP-low+, PREP-high while the potential at the bus wire DB-dmy is maintained at the ground potential 0V by the p-channel MOSFET PREP-dmy. At this time point, since the control signal EN is at the low level 0V, the n-channel MOSFET MN-1, MN-2, . . . , MN-n, MN-low, MN-low+ are not conducting. When the control signal EN changes to the high level VCC at a time point t1, the n-channel MOSFETs MN-1, MN-2, ..., MN-n remain in the non-conducting state or become conducting in dependence on whether the bit signals DOUT-1, DOUT2, ..., DOUT-n are at the high level VCC or at the low level 0V, respectively. On the other hand, the n-channel MOSFETs MN-low and MN-low+ are switched on. Assuming, by way of example, that k n-channel MOSFETs MN-#1, MN-#2, ..., MN-#k of the n-channel MOSFETs MN-1, MN-2, ..., MN-n are switched on, the (k+3) bus wires DB-#1, DB-#2, ..., DB-#k, DB-low, DB-low+ and DB-dmy share the charge stored in the wiring capacitances of the (k+2) bus wires DB-#1, DB-#2, ..., DB-#k, DB-low and DB-low+, whereby the potentials on the former settles at a potential level (also designated by V-low) which lies between the supply voltage level VCC and the ground potential 0V. In contrast, the potentials at the other bus wires than the bus wires DB-#1, DB-#2, ..., DB-#k as well as the bus wire DB-high remain as maintained at the supply voltage level VCC.

When the activation signal ACT changes to the high level VCC at a time point t2, the amplifiers AMP-1, AMP-2, ..., AMP-n are put into operation. In each of the amplifiers AMP-i (i=1, 2, ..., n), a pseudoreference potential lying intermediate between the potentials VCC and V-low of the bus wires DB-high and DB-low is generated on the basis of the potentials VCC and V-low, wherein differential amplification is performed on the input signal of the bus wire DB-i with referred to the reference potential. Thus, the output data DIN-1, DIN-2, ..., DIN-n of the amplifiers assume the high level VCC or low level 0V in correspondence to the potentials VCC or V-low of the bus wires DB-1, DB-2, ..., DB-n.

When the precharge signal PRE changes to the high level VCC at a time point t3, the (n+2) bus wires DB-1, DB-2, ..., DB-n, DB-low and DB-low+ are charged up to the supply voltage level VCC via the p-channel MOSFETs PREP-1, PREP-2, ..., PREP-n, PREP-low and PREP-low+, respectively, while the bus wire DB-dmy is discharged to the ground potential 0V via the n-channel MOSFET PREN-dmy to be thereby set to the state ready for the succeeding operation cycle.

Figure 26A:
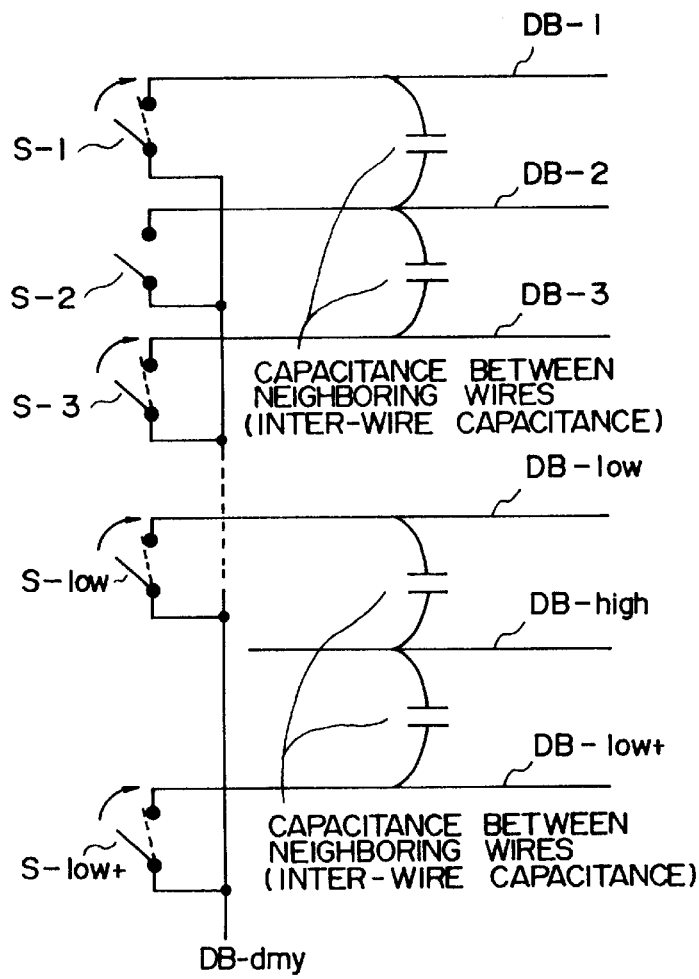
FIGS. 26A and 26B are views for illustrating in what manner the crosstalk problem can be solved with the bus system shown in FIG. 23A.
Figure 26B:
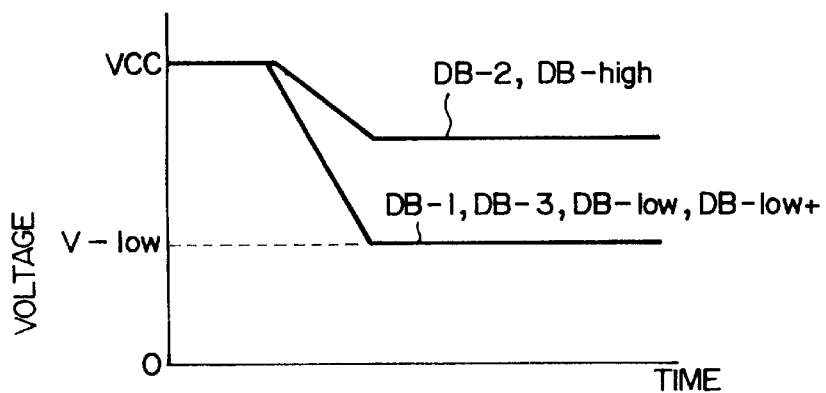

By virtue of the teaching of the invention incarnated in the instant embodiment, crosstalk noise which the bus wire DB-i (i=1, 2, ..., n) remaining at the high level receive when the potential at the neighboring bus line DB-i−1 or DB-i+1 shifts to the low level can be compensated for by equivalent crosstalk noise which the bus wire DB-high used for inputting the reference potential of the high level to the amplifier receives from the neighboring bus wires DB-low and DB-low+ (refer to FIG. 26). Thus, the noise margin can be protected against degradation due to the crosstalk and hence the erroneous bus operation due to the crosstalk noise can positively be prevented in the case of the bus structure according to the instant embodiment of the invention.

Figure 25:
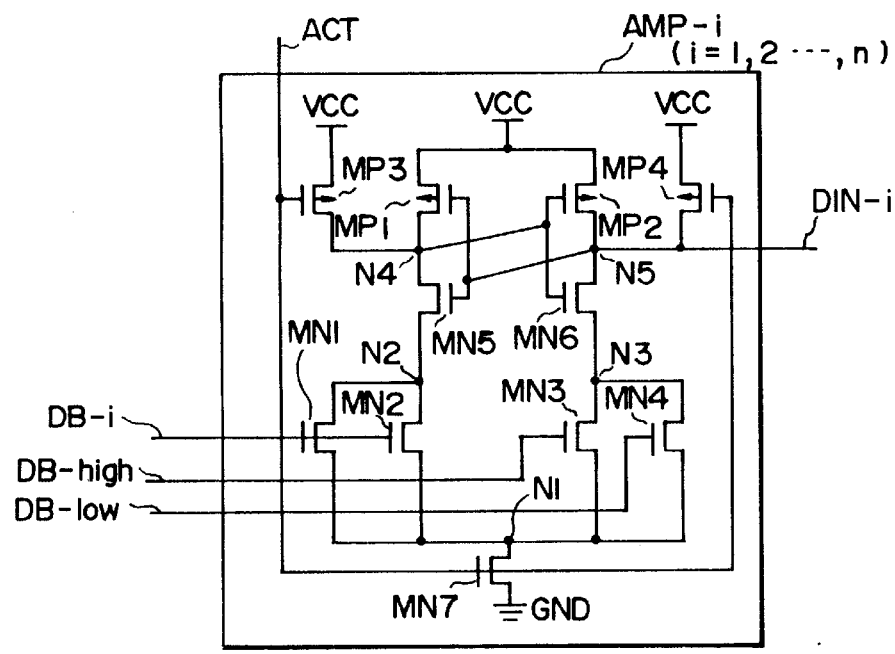
FIG. 25 is a circuit diagram showing a configuration of a differential amplifier which can be employed in the bus driving system shown in FIG. 23.

FIG. 25 is a circuit diagram showing a configuration of a differential amplifier which can be employed in the bus structure shown in FIG. 23A. Concerning the timings for the signals shown in FIG. 25, reference should be made to FIG. 23B.

During a period from the time point t0 to t2, the activation signal ACT is at a low level 0V with the p-channel MOSFETs MP-3 and MP-4 conducting, whereby the nodes N3 and N4 are maintained at the supply voltage level VCC. On the other hand, the n-channel MOSFET MN-7 is in the non-conducting state, whereby the current path in the associated circuitry is interrupted.

When the activation signal ACT changes to a high level VCC at the time point t2, the p-channel MOSFETs MP-3 and MP-4 are switched off while the n-channel MOSFET MN-7 is switched on. Thus, the n-channel MOSFET MN-7 operates to pull down the potentials at the nodes N2 and N3 to the ground potential 0V via the n-channel MOSFETs MN-1 and MN-2 and via the n-channel MOSFETs MN-3 and MN-4. Consequently, the path or route extending from the node N2 to the node N1 assumes high- or low-conducting state in dependence on whether the voltage of the associated bus wire DB-i is at the high level VCC or low level V-low. Further, because the potential of high level VCC is applied to the gate of the n-channel MOSFET MN-3 with the potential of low level V-low being applied to the gate of the n-channel MOSFET MN-4, the path extending from the node N3 to the node N1 assumes an intermediate conducting state. The relation in the conduction between these two paths N2→N1 and N3→N1 is transmitted to a latch circuit constituted by the n-channel MOSFETs MN-5 and MN-6 and the p-channel MOSFETs MP-1 and MP-2, whereby data DIN-i of the high level VCC or low level 0V is outputted. By way of example, when the voltage of the bus wire DB-i is at the high level VCC, the node N2 tends to be pulled down toward the ground potential 0V more intensively than the node N3, as a result of which the n-channel MOSFET MN-5 becomes more conductive than the n-channel MOSFET MN-6, rendering the p-channel MOSFET MP-2 to be more conductive than the p-channel MOSFET MP-1. Consequently, the n-channel MOSFET MN-5 is caused to be more conductive than the n-channel MOSFET MN-6. Thus, a positive feedback is validated to the latch circuit, making the n-channel MOSFET MN-5 and the p-channel MOSFET MP-2 conduct completely while rendering the n-channel MOSFET MN-6 and the p-channel MOSFET MP-1 not to conduct at all, as a result of which data DIN-i of the high level VCC is outputted. In contrast, when the voltage of the bus wire DB-i is at the low level V-low, the n-channel MOSFET MN-6 and the p-channel MOSFET MP-1 are rendered to conduct fully with the n-channel MOSFET MN-5 and the p-channel MOSFET MP-2 being blocked completely as the result of a similar positive feedback operation, whereby data DIN-i of the low level 0V is outputted. After completion of the positive feedback operation of the latch circuit, there is available no path for the DC current to flow. Accordingly, power consumption of the amplifier circuit under consideration is limited to only a short period from the activation of the circuit at the time point t2 to the fixation of the level of the data DIN-i.

Figure 27:
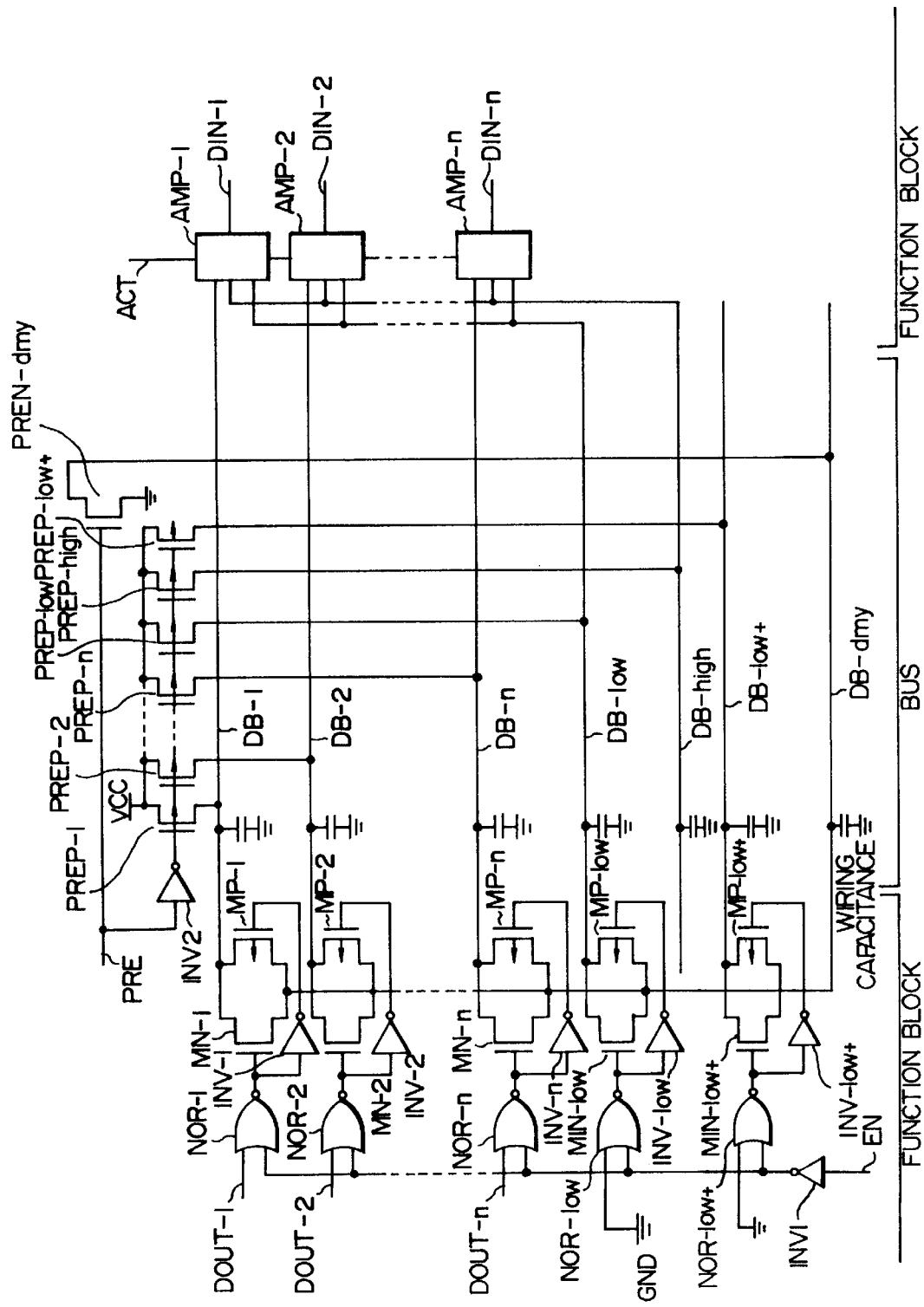
FIG. 27 is a circuit diagram showing a bus driving system according to a further embodiment of the present invention.

FIG. 27 shows a bus structure according to a further embodiment of the present invention which differs from that shown in FIG. 23A in that a p-channel MOSFET is connected in parallel with each of the n-channel MOSFETs MN-1, MN-2, ..., MN-n, MN-low and MN-low+. Owing to the parallel connection of the MOSFETs of opposite polarities in this manner, the potentials of the bus wires DB-dmy and the other interconnected via the drain-source path of the parallel MOSFETs can positively be equalized.

Figure 28:
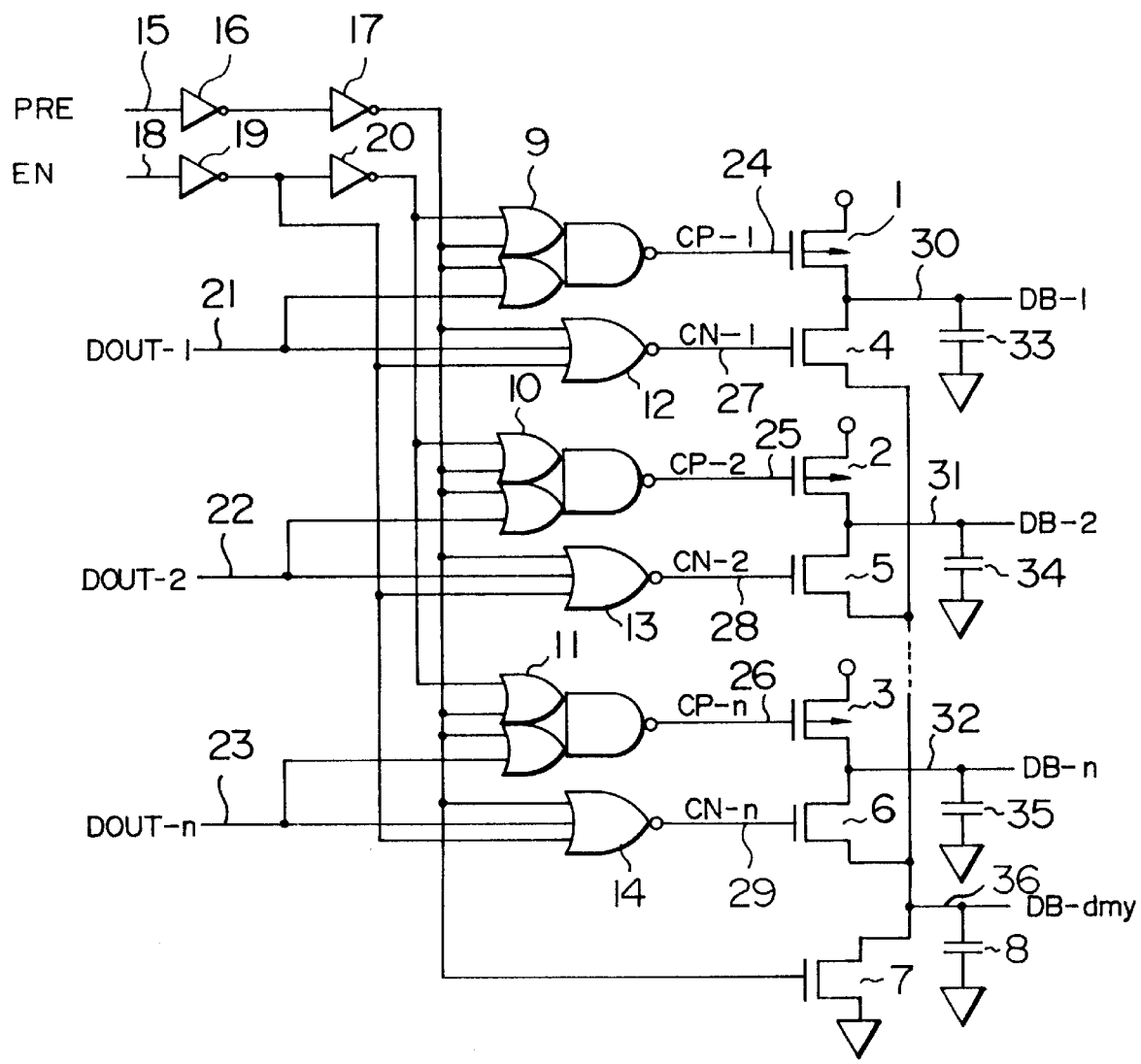
FIG. 28 is a circuit diagram showing a configuration of an output driver circuit which is designed to perform a precharge control of output wires according to yet another embodiment of the present invention.

FIG. 28 is a circuit diagram showing a configuration of an output driver circuit which is designed to perform a precharge control of output wires according to another embodiment of the present invention. Connected to a power source and output wires 30, 31 and 33 are p-channel MOS transistors 1, 2 and 3, respectively. Of the n-channel MOS transistors connected in series between the output wires and the ground, those located closer to the output wires are denoted by reference numerals 4, 5 and 6, respectively. A capacitor 8 is connected between the series connection of the n-channel MOS transistors and the ground potential. Control signals (CP-i) 24, 25 and 26 for the p-channel MOS transistors are generated by complex logic gates 9, 10 and 11, respectively. On the other hand, control signals (CN-i) 27,28 and 29 for the n-channel MOS transistors 4, 5 and 6 connected to the output wire are generated by NOR gates 12, 13 and 14, respectively. A control signal (PRE) 15 for controlling the precharge timing for the output wire is enhanced by inverters 16 and 17 to be subsequently supplied to bit control logics. Similarly, a control signal (EN) 18 for controlling on-state (drive state) and off-state (floating state) of the driver output is enhanced by inverters 19 and 20 to be supplied to the bit control logic. Additionally inputted to this control logic are bit signals (DOUT-i) 21, 22 and 23 which are to be delivered externally.

Figures 29, 30:
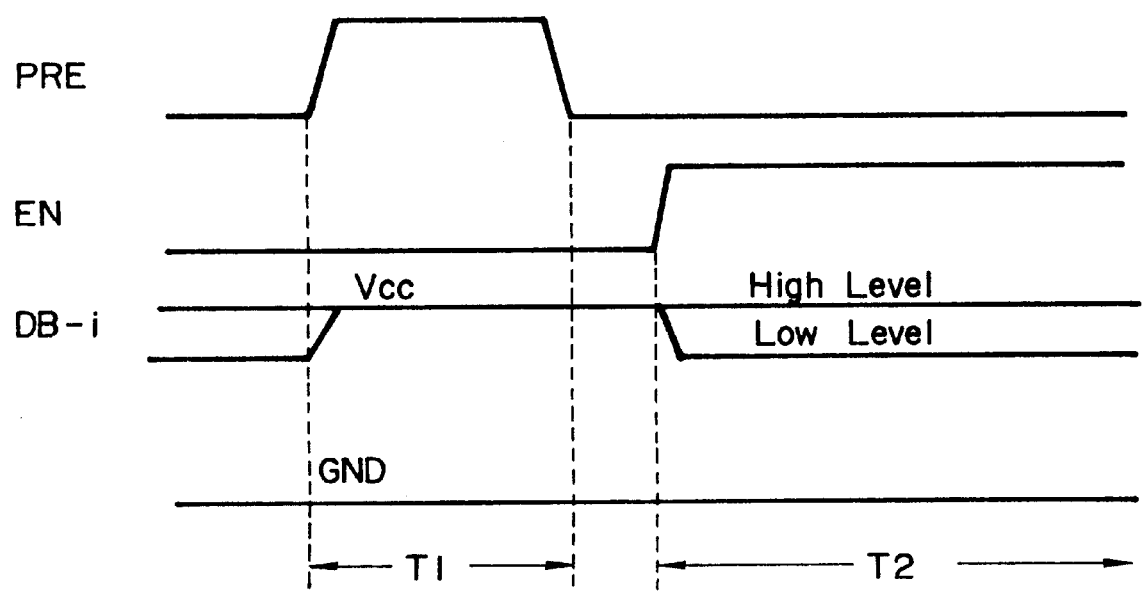
FIG. 29 is a view showing a table for illustrating functions of a control logic circuit incorporated in an output driver circuit shown in FIG. 28.
FIG. 30 is a timing diagram for illustrating operations of an output driver shown in FIG. 28.

Functions of the bit control logics each constituted by the complex gates 9, 10 and 11 and the NOR gates 12, 13 and 14 are summarized in a function table shown in FIG. 29. In this table, symbol "*" represents so-called "don't care" (i.e., it is of no matter whether the relevant signal assumes high level (H) or low level (L)).

During a period in which the control signal (PRE) 15 is at a level H (=logic "1"), output wires 30, 31 and 32 are precharged. During this period, the control signals (CP-i) 24, 25 and 26 for the p-channel MOS transistors are at low level L (=logic "0") to thereby turn on the p-channel MOS transistor 1, 2 and 3. On the other hand, the control signals (CN-i) 27, 28 and 29 for the n-channel MOS transistors 4, 5 and 6 are at the level L with the n-channel MOS transistors 4, 5 and 6 being switched off. Further, the input to the gate of the n-channel MOS transistor 7 is at the level H (logic "1"), whereby the n-channel MOS transistor 7 is switched on (in the conducting state). As a result of this, the output wires 30, 31 and 32 are precharged to the level H. The capacitor 8 is discharged via the n-channel MOS transistor 7, whereby a bus wire (DB-dmy) 36 is connected to the ground potential.

During a period in which the control signal (PRE) 15 and the control signal (EN) 18 are at the level L (logic "0"), the output wires 30, 31 and 32 are maintained in the floating state. As can also be seen from FIG. 29, during this period, the control signals (CP-i) 24, 25 and 26 for the p-channel MOS transistors 1, 2, and 3 are at the level H (logic "1"), and thus the p-channel MOS transistors 1, 2 and 3 are in the non-conducting (off) state. On the other hand, the control signals (CN-i) 27, 28 and 29 for the n-channel MOS transistors 4, 5 and 6 are at the level L (logic "0"), rendering the n-channel MOS transistors 4, 5 and 6 non-conducting (off). Further, the gate input to the n-channel MOS transistor 7 is also at the level L (logic "0"), and thus the n-channel MOS transistor 7 is in the off-state. As the result, the output wires 30, 31 and 32 are in the floating state.

During the period in which the control signal (PRE) 15 is at the level L (logic "0") with the control signal (EN) 18 being at the level H (logic "1"), data are outputted onto the output wires 30, 31 and 32 in accordance with the bit signals (OUT-i) 21, 22 and 23 to be sent out. During this period, the on/off control of the p-channel MOS transistors 1, 2 and 3 and the n-channel MOS transistors 4, 5 and 6 is performed in dependence on logical values of the bit signals (OUT-i) 21, 22 and 23 to be sent out, as can also be seen from FIG. 29. Further, the input to the gate of the n-channel MOS transistor 7 is at the level L (logic "0"), whereby the n-channel MOS transistor 7 is in the off-state.

When the bit signals (DOUT-i) to be sent out are at the level L (logic "0"), the p-channel MOS transistors 1, 2 and 3 are in the off-state (non-conducting state) while the n-channel MOS transistors 4, 5 and 6 are in the on-state (conducting state). Since the n-channel MOS transistor 7 is in the off-state, the charges stored in wiring capacitances 33, 34 and 35 of the output wires 30, 31 and 32 are distributed to the wiring capacitances 33, 34 and 35 and the capacitor 8 without being discharged. As a result of this, the potentials on the output wires are lowered by a proportion which corresponds to the electric charge supplied to the capacitor 8. The potential thus lowered represents the output of the level L (logic "0").

On the other hand, when the bit signals (DOUT-i) to be sent out are at the level H (logic "1"), the p-channel MOS transistors 1, 2 and 3 are switched on (conducting) with the n-channel MOS transistors 4, 5 and 6 being switched off (non-conducting). The n-channel MOS transistor 7 is also in the off-state, which is however of no influence to the value or level to be sent out. The output wires 30, 31 and 32 are supplied with the supply voltage via the p-channel MOS transistors 1, 2 and 3, which results in that the output wires are kept at the level of the supply voltage.

FIG. 30 is a timing diagram for illustrating operations of the output driver controlled by the control signal (PRE) 15 and the control signal (EN) 18. In the figure, a symbol T1 represents the precharge period. The control signal (PRE) 15 is set to the level H (logic "1") to thereby precharge the bus wire DB-i to the level of the supply voltage. A reference symbol T2 represents the data send-out period. By setting the control signal (PRE) 15 to the level L (logic "0") with the control signal (EN) 18 to the level H (logic "1"), signal values corresponding to the bit signals (OUT-i) 21, 22 and 23 to be sent out are delivered onto the output wires 30, 31 and 32. The output potential of the level H (logic "1") is determined by the supply voltage level, while the output potential of the level L (logic "0") is determined in dependence on a proportion of the electric charge stored in the wiring capacitance of the output wire which is supplied to the capacitor 8 and assumes a higher level than the ground potential. In this manner, reduction in the swing of the output potential can be realized.

Figure 31:
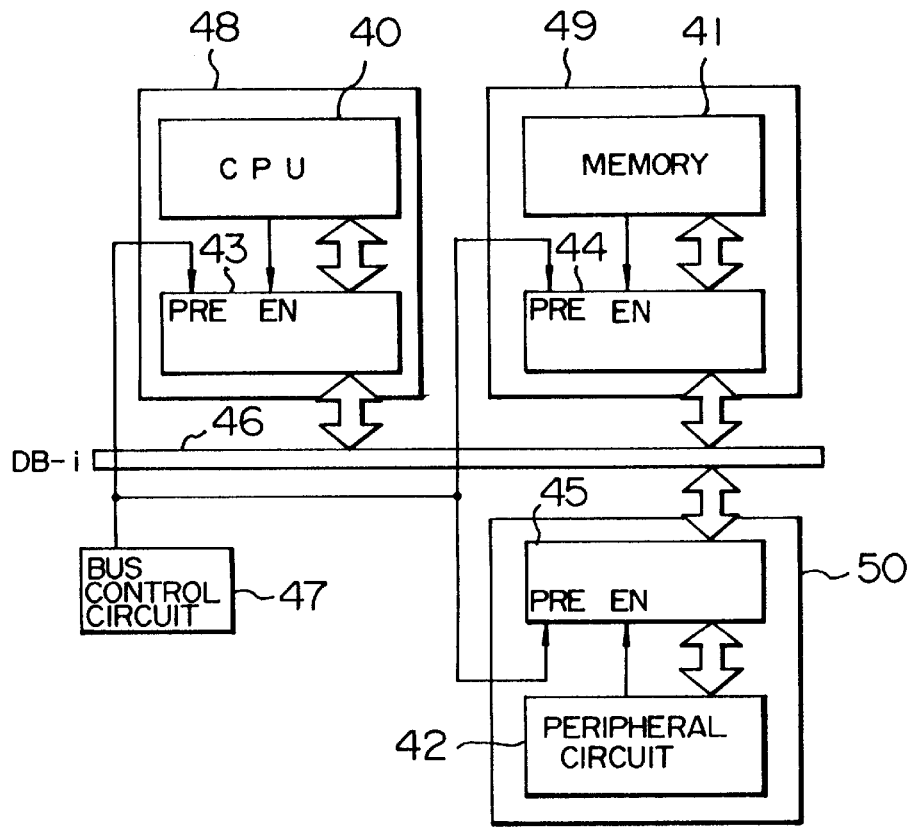
FIG. 31 is a block diagram showing a single-chip microcomputer to which the output driver circuits shown in FIG. 28 can be applied.

FIG. 31 is a block diagram showing a single-chip microcomputer in which the output driver circuits according to the embodiment shown in FIG. 28 are incorporated as an output driver 43 of a CPU 40, an output driver 44 of a memory 41 and as an output driver 45 of a peripheral circuit 42. Thus, the CPU 40, the built-in memory 41 and the built-in peripheral circuit 42 such as a timer, serial communication interface and other constitute macrocells each incorporating the output driver shown in FIGS. 28. By adding the output drivers 43, 44 and 45 of FIG. 28 to the above-mentioned macrocells, there are realized new macrocells 48, 49 and 50, respectively. For assembling the output drivers 43, 44 and 45 in the respective macrocells, it is required to make available two types of the control signals PRE and EN. Since the control signal PRE is a bus timing control signal, it is generated by a bus control circuit 47. On the other hand, the control signal EN is used for controlling the data output. Accordingly, the control signal EN has to be extracted from the macrocell to which the output driver is connected. However, since the control signal EN is intrinsically generated within the macrocell for controlling the output driver therein, it is required for the extraction of the control signal EN only to attach an additional wire to the macrocell. With this arrangement, it is possible to lower the swing of the output potential of the internal data bus 46. In that case, the capacitance of the internal data bus 46 will considerably be increased because of addition of capacitances (input gate capacitance, dispersed capacitance of the output driver and other) of the interfaces of the peripheral circuit connected to the internal data bus 46. Such being the circumstances, by limiting the swing of the output potential, power consumption or dissipation can significantly be reduced.

Figure 32:
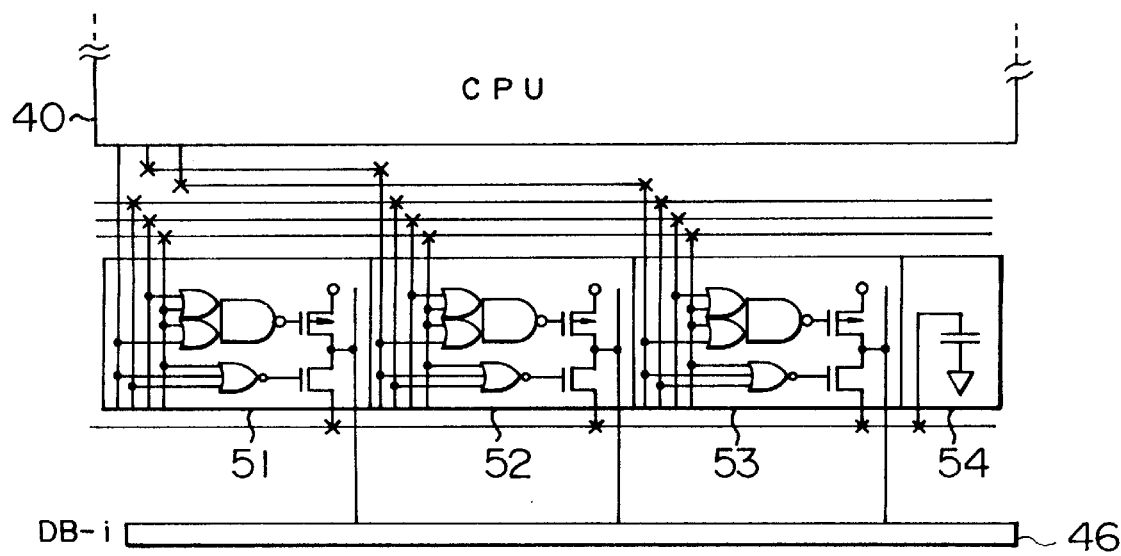
FIG. 32 is a circuit diagram showing another exemplary device in which the output driver shown in FIG. 28 is applied to a single-chip microcomputer.

FIG. 32 shows another example for illustrating incorporation of the output driver shown in FIG. 28. In the case of the exemplary embodiment shown in FIG. 31, the output driver according to the invention is incorporated as a part of the macrocell. In contrast, in the case of the example shown in FIG. 32, the output driver according to the invention is incorporated as a part of a random gate circuit. In general, the ASIC (Application Specific Integrated Circuit) or the like including a single-chip microcomputer or a CPU incorporates in addition to the macrocells such as the CPU, the memory, the peripheral circuit and others a control logic circuit for controlling these macrocells. Since the control logic circuit differs from one to another chip, it is implemented by combining standard logic gate cells such as NAND gate, NOR gate and the like. Accordingly, the output driver shown in FIG. 28 is realized in a same form as the standard logic gate cell. In the case of the embodiment shown in FIG. 2, the p-channel MOS transistor of the output driver and the n-channel MOS transistor connected to the output wire is implemented as one standard cell 51, 52 or 53. The capacitor is disposed as another standard cell 54. These cells are interconnected by inter-cell wiring. Although not shown in FIG. 32, the n-channel MOS switching transistor connected to the ground is similarly formed and disposed. In this way, by disposing the output driver realized in the form of the standard cell at the outside of the CPU 40 realized in the macrocell, and by interconnecting these cells and connecting them to the internal data bus (DB-i) 46, there can be implemented a logic LSI of a same logical structure as that of the device shown in FIG. 31.

Figures 33, 34:
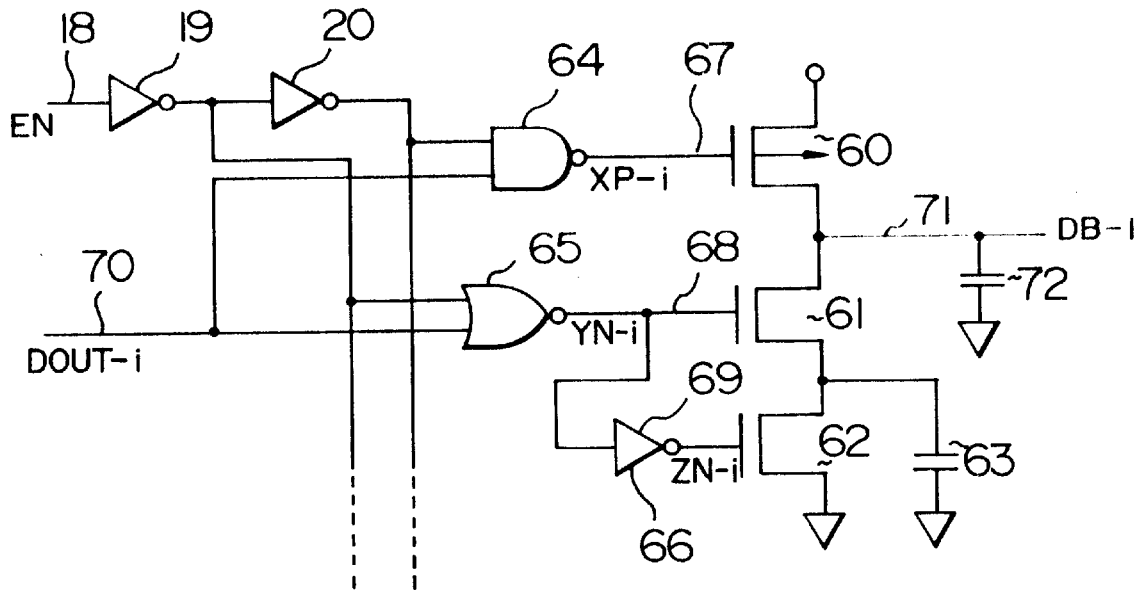
FIG. 33 shows an output driver according to yet another embodiment of the present invention.
FIG. 34 is a function table summarizing functions of bit control logics realized by control logic circuits incorporated in the output driver circuit shown in FIG. 33.

FIG. 33 shows another embodiment of the output driver according to the present invention. The output driver circuit shown in FIG. 28 serves for the precharge control of the data output wire. In the case of the output driver now under consideration, the precharge control is spared. Connected between the supply voltage and an output wire 70 is a p-channel MOS transistor 60, while connected between the output wire and the ground are n-channel MOS transistors 61 and 62 in series. Further, a capacitor 63 is connected between the series connection of the n-channel MOS transistors and the ground. A control signal (XP-i) 67 for the p-channel MOS transistors (YN-i, ZN-i) 68 and 69 for the n-channel MOS transistors 61 and 62 are generated through cooperation of a NOR gate 65 and an inverter 66. A control signal (EN) 18 for controlling the on-state (driver state) and the off-state (floating state) of the driver output is enhanced by the inverters 19 and 20 to be subsequently supplied to a control logic for the individual bits. Further, inputted to the control logic is a bit signal (DOUT-i) 70 to be sent out.

FIG. 34 shows a function table summarizing the functions of the bit control logic constituted by the NAND gate 64, the NOR gate 65 and the inverter 66.

During a period in which the control signal (EN) 18 is at a level L (logic "0"), the output wire 71 is held in the floating state. As can be seen from FIG. 34 as well, during this period, the control signal (XP-i) 67 of the p-channel MOS transistor 60 is at a level H (logic "1"), and thus the MOS transistor 60 is in the non-conducting state (off-state). On the other hand, the control signal (YN-i) 68 for the n-channel MOS transistor 61 is at the level L (logic "0") with a result that the MOS transistor 60 is also in the off-state. Further, the control signal (ZN-i) 69 for the n-channel MOS switching transistor 62 is at the H level (logic "1"), rendering the transistor 62 to be conducting (on). As a result of this, the data output wire 71 is in the floating state to allow the charge stored in the capacitor 63 to be discharged therefrom.

During a period in which the signal (EN) 18 is at the high level H (logic "1"), data is outputted onto the output wire 71 in accordance with the bit signal (DOUT-i) 70 to be sent out. Accordingly, during this period, on/off control of the p-channel MOS transistor 60 and the n-channel MOS transistors 61 and 62 is performed in dependence on the values of the bit signal (DOUT-i) 70 to be sent out, as is apparent from FIG. 34.

When the bit signal (DOUT-i) to be sent out is at the level H (logic "1"), the p-channel MOS transistor 60 is switched to the on-state (conducting state) with the n-channel transistor 61 being switched to the off-state (non-conducting state). The n-channel MOS switching transistor 62 is switched to the on-state to thereby allow the charge stored in the capacitor 63 to be discharged, which however exerts no influence to the output value. The output wire 71 is supplied with the supply voltage via the p-channel MOS transistor 60. Consequently, the potential on the output wire assumes the level of the supply voltage.

When the bit signal (DOUT-i) to be sent out is at the level L (logic "0"), the p-channel MOS transistor 60 is in the off-state (non-conducting state) with the n-channel MOS transistor 61 being in the on-state (conducting state). Since the n-channel MOS switching transistor 62 is in the off-state, any charge stored in the wiring capacitance 72 of the output wire 71 is not discharged but distributed to the capacitor 63 and the wiring capacitance. As a result of this, the potential on the output wire is lowered by a proportion corresponding to the charge distributed to the capacitor 63. This lowered potential represents the output of the level L (logic "0"). Since the data output wire 71 is not always precharged every operation cycle, the output of the level L varies in dependence on the potential outputted in the preceding operation cycle. However, because the level H is always fixed to the supply voltage level, the change in the L-level output provides no cause for erroneous operation. In this manner, the reduction in the swing of the output potential can be realized.

It is self-explanatory that the output driver shown in FIG. 33 can equally be utilized as integral parts of a single-chip microcomputer, ASIC (Application Specific Integrated Circuit) incorporating a CPU and others, as described hereinbefore by reference to FIGS. 31 and 32. In this conjunction, it should be noted that the precharge control signal PRE required in the case of the embodiments shown in FIGS. 31 and 32 is made unnecessary for the output driver shown in FIG. 33. Accordingly, the output driver shown in FIG. 33 can be built in simply by deleting the control signal (PRE) circuitry.

What is claimed is:

1. A bus driving system, comprising:

bus wires wired between a transmitting end and a receiving end for carrying a plurality of data signals and control signals;

a driver circuit provided at said transmitting end for driving said bus wires;

a control circuit for redistributing wiring capacitances of transmission lines formed by said bus wires; and a detection circuit provided at said receiving end for detecting bus signals.

2. A bus driving system according to claim 1, wherein said control circuit includes a charge circuit for supplying substantially a supply voltage to said driver circuit, and a discharge circuit for supplying substantially a ground level to said drive circuit.

3. A bus driving system according to claim 2,
wherein said discharge circuit includes a switch circuit for discharging electric charge stored in wiring capacitances of said bus wires.

4. A bus driving system according to claim 2,
wherein said charge circuit includes a switch circuit for charging electric charge stored in wiring capacitances of said bus wire.

5. A bus driving system according to claim 1,
wherein said driver circuit includes driving MOSFET elements, conductors to which either drain paths or source paths of said driving MOSFET elements are connected in common, are wired from said transmitting end to said receiving end.

6. A bus driving system according to claim 5,
wherein said driving MOSFET elements include a parallel connection of a p-channel MOSFET and an n-channel MOSFET.

7. A bus driving system according to claim 5,
wherein said driving elements includes a NAND circuit and a p-channel MOSFET for driving a signal from said NAND circuit.

8. A bus driving system according to claim 1,
further comprising:
a first control wire on which said control signal is usually at zero level and assumes an intermediate level between said substantial supply voltage and said substantial ground level upon redistribution of wiring capacitances of the transmission lines formed by said bus wires.

9. A bus driving system according to claim 1,
further comprising:
a first control wire for carrying said control signal; and
a second control wire of which potential is usually at a supply voltage level and assumes an intermediate level between said substantial supply voltage level and said substantial ground level upon redistribution of wiring capacitances of the transmission lines formed by said wires.

10. A bus driving system according to claim 9,
wherein said bus wires includes a plurality of sets of wires, each of said sets includes a data signal wire, said first control signal wire and said second control signal wire.

11. A bus driving system according to claim 1,
wherein said bus wires includes a plurality of sets of wires, each of said sets includes a data signal wire, a first control wire for carrying said control signal, and a second control wire of which potential is usually at a supply voltage level and assumes an intermediate level between said substantial supply voltage level and said substantial ground level upon redistribution of wiring capacitances of the transmission lines formed by said wires.

12. A bus driving system according to claim 1,
wherein said detection circuit includes:
a signal generating circuit for generating an activation signal, a second control signal and a reference signal of said substantial supply voltage level; and
a latch circuit for regenerating a signal level on the basis of a signal outputted from said signal generating circuit.

13. A bus driving system according to claim 12,
further comprising a circuit for generating said activation signal which contains a signal for charging the wiring capacitances of said bus signal wires and a signal for discharging the wiring capacitances of said control wires.

14. A bus system, comprising:
a bus driving system including:
bus wires wired between a transmitting end and a receiving end for carrying a plurality of data signals and control signals;
a driver circuit for driving said bus wires at said transmitting end;
a charge circuit for charging wiring capacitance of transmission lines formed by said bus wires and extending from said transmitting end to said receiving end;
control wires for redistributing wiring capacitance of said bus wires;
a switch circuit for discharging electric charge stored in said wiring capacitances of said control wires; and
a detection circuit for detecting data signals from said bus wires at said receiving end; and
a bus interface for interconnecting execution/control means, memory means storing data signals and an external bus to one another via said bus driving system.

15. In an information processing system which comprises antenna means for transmitting and receiving a radio signal, a modulator/demodulator circuit for converting said signal supplied from said antenna means, at least one of a digital-to-analogue converter for converting said signal into an analogue signal and an analogue-to-digital converter for converting said signal into a digital signal, and memory means for storing information;
a base band LSI (Large Scale Integrated circuit) for controlling said information processing system, comprising:
bus wires wired between a transmitting end and a receiving end for carrying a plurality of data signals and control signals;
a driver circuit for driving said bus wires at said transmitting end;
a charge circuit for charging wiring capacitances of transmission lines formed by said bus wires and extending from said transmitting end to said receiving end;
control wires for redistributing wiring capacitances of said bus wires;
a switch circuit for discharging electric charge stored in said wiring capacitances of said control wires; and
a detection circuit for detecting data signals from said bus wires at said receiving end;
arithmetic means for arithmetically determining data to be sent to said information processing system;
data address control means for controlling addresses of said data;
instruction-dedicated read-only memory means for storing instructions commanding operations of said information processing system;
program control means for controlling operations of said information processing system; and
bus interface means for connection to said information processing system.

16. An integrated circuit including a plurality of chips mounted on a package board and a bus system for interconnecting said chips, said bus system including a bus driving system which comprises:

bus wires wired between a transmitting end and a receiving end for carrying a plurality of data signals and control signals;

a driver circuit for driving said bus wires at said transmitting end;

a charge circuit for charging wiring capacitances of transmission lines formed by said bus wires and extending from said transmitting end to said receiving end;

control wires for redistributing wiring capacitances of said bus wires;

a switch circuit for discharging electric charge stored in said wiring capacitances of said control wires; and a detection circuit for detecting data signals from said bus wires at said receiving end.

17. An integrated circuit device including a plurality of chips mounted on a package board and a bus system for interconnecting said chips, said bus system including a bus driving system which comprises:

bus wires wired between a transmitting end and a receiving end for carrying a plurality of data signals and control signals;

a driver circuit for driving said bus wires at said transmitting end;

a charge circuit for charging wiring capacitances of transmission lines formed by said bus wires and extending from said transmitting end to said receiving end;

control wires for redistributing wiring capacitances of said bus wires;

a switch circuit for discharging electric charge stored in said wiring capacitances of said control wires; and a detection circuit for detecting data signals from said bus wires at said receiving end, said integrated circuit device being implemented in the form of a package;

wherein at least a power source wire, a ground wire and said control wires are led out to corresponding pins of said package.

18. A bus driving system for transmitting data of n bits (where n is a positive integer), comprising:

(n+2) wires including first to (n+2)-th wires;

at least one set of (n+1) switching circuits including first to (n+1)-th switching circuits;

means for making potentials at said first to (n+1)-th wires coincide with a level of a first operation potential level; and means for making potential at said (n+2)-th wire coincide with a second operation potential level;

wherein a k-th switching circuit (where k is a given integer greater than 1 (one) and smaller than (n+1)) controls conduction and non-conduction between said k-th wire and said (n+2)-th wire;

said first to n-th switching circuits responding to said first to n-th bit signals, respectively; and wherein said first to (n+1)-th switching circuits respond to a first control signal.

19. A bus driving system according to claim 18, wherein said k-th switching circuit (where k is greater than 1 (one) and smaller than (n+1) inclusive thereof) includes an n-channel MOSFET (Metal Oxide Semiconductor Field Effect Transistor) having a drain-source path connected between said k-th wire and said (n+2)-th wire.

20. A bus driving system according to claim 18, wherein said k-th switching circuit (where k is greater than 1 (one) and smaller than (n+1) inclusive thereof) includes a p-channel MOSFET having a drain-source path connected between said k-th wire and said (n+2)-th wire.

21. A bus driving system according to claim 18, wherein said bus including at least one set of first to n-th amplifier circuits, an i-th amplifier circuit (where i represents a given integer greater than 1 (one) and smaller than n inclusive thereof) includes:

first and second n-channel MOSFETs (Metal Oxide Semiconductor Field Effect Transistors) each having a source terminal connected to a first node and a drain terminal connected to a second node;

third and fourth n-channel MOSFETs each having a source terminal connected to said first node and a drain terminal connected to a third node;

a fifth n-channel MOSFET having a source terminal connected to said second node, a drain terminal connected to a fourth node and a gate terminal connected to a fifth node;

a sixth n-channel MOSFET having a source terminal connected to said third node, a drain terminal connected to said fifth node and a gate terminal connected to said fourth node;

a first p-channel MOSFET having a drain terminal connected to said fourth node, a gate terminal connected to said fifth node and a source terminal connected to a first power source;

a second p-channel MOSFET having a drain terminal connected to said fifth node, a gate terminal connected to said fourth node and a source terminal connected to said first power source;

a switching circuit for controlling conduction and non-conduction between said fourth node and said first power source;

a switching circuit for controlling conduction and non-conduction between said fifth node and said first power source; and a switching circuit for controlling conduction and non-conduction between said first node and a second power source;

wherein the gate terminals of said first and second n-channel MOSFETs are connected to the i-th wire; and wherein one of the gate terminals of said third and fourth n-channel MOSFETs is at a same potential as said first operation potential level while the other gate terminal is connected to said (n+1)-th wire.

22. A bus driving system according to claim 21, further comprising:

means for making said second node and said third node at a same potential level.

23. A bus driving system according to claim 21, further comprising:

a switching circuit for controlling conduction and non-conduction between said second node and said first power source; and a switching circuit for controlling conduction and non-conduction between said third node and said first power source.

24. A bus driving system according to claim 18, further comprising:

a (n+3)-th wire (where n represents a positive integer); and means for making potential of said (n+3)-th wire coincide with said first operation potential level.

25. A microprocessor including a bus driving system for driving a n-bit data bus (where n is a positive integer), said bus driving system comprising:

(n+2) wires including first to (n+2)-th wires;

at least one set of (n+1) switching circuits including first to (n+1)-th switching circuits;

means for making potentials at said first to (n+1)-th wires coincide with a level of a first operation potential level; and means for making potential at said (n+2)-th wire coincide with a second operation potential level;

wherein a k-th switching circuit (where k is a given integer greater than 1 (one) and smaller than (n+1)) controls conduction and non-conduction between said k-th wire and said (n+2)-th wire;

said first to n-th switching circuits responding to said first to n-th bit signals, respectively; and wherein said first to (n+1)-th switching circuits respond to a first control signal.

26. A package board including a plurality of chips mounted on a board, and a bus driving system used as an external bus for interconnection of said chips, said bus driving system comprising:

(n+2) wires including first to (n+2)-th wires;

at least one set of (n+1) switching circuits including first to (n+1)-th switching circuits;

means for making potentials at said first to (n+1)-th wires coincide with a level of a first operation potential level; and means for making potential at said (n+2)-th wire coincide with a second operation potential level;

wherein a k-th switching circuit (where k is a given integer greater than 1 (one) and smaller than (n+1)) controls conduction and non-conduction between said k-th wire and said (n+2)-th wire;

said first to n-th switching circuits responding to said first to n-th bit signals, respectively; and wherein said first to (n+1)-th switching circuits respond to a first control signal.

27. A large scale integrated circuit (LSI) comprising:

an integrated circuit; and a plurality of input/output ports, connected to said integrated circuit, operating in synchronism with a clock signal, wherein one of high and low levels at each of said input/output ports remains constant independent of operation cycles, while the other of said high and low levels is changed depending on the operation cycles.

28. A bus driving system for driving a bus for data of n bits (where n is a positive integer), comprising:

(n+1) wires including first to (n+1)-th wires;

at least one set of n switching circuits including first to n-th switching circuits;

means for making potentials at said first to n-th wires coincide with a first operation potential level; and means for making potential at said (n+1)-th wire coincide with a second operation potential level;

wherein a k-th switching circuit (where k is a given integer greater than 1 (one) and smaller than n) controls conduction and non-conduction between said k-th wire and said (n+1)-th wire, said first to n-th switching circuits responding to said first to n-th bit signals and a first control signal, respectively.

29. A method for controlling a bus driving system, said bus being connected to a circuit, said method comprising the step of:

controlling the bus driving system by keeping constant a total sum of charge stored in capacitances parasitic to wires of a bus independent of a level of input data throughout a period from a time point at which precharge of the bus is completed to a time point at which a signal makes appearance at the bus.

30. A bus driving system, comprising:

bus wires wired between a transmitting end and a receiving end for carrying a plurality of data signals and control signals;

a driver circuit provided at said transmitting end for driving said bus wires;

a control circuit for redistributing wiring capacitances of transmission lines formed by said bus wires; and a detection circuit provided at said receiving end for detecting bus signals, said control signals being delivered from first to fourth control wires;

wherein said first control wire is usually at zero level and assumes an intermediate level between a level substantially equal to the supply voltage level and a level substantially equal to the ground level upon redistribution of the wiring capacitances of the transmission lines formed by said bus wires;

said second and third control wires are usually at said supply voltage level and assume an intermediate level between a level substantially equal to the supply voltage level and a level substantially equal to the ground level upon redistribution of the wiring capacitances of the transmission lines formed by said bus wires, respectively; and wherein said fourth wire is disposed adjacent to said second and third control lines and usually at said supply voltage level while assuming a level substantially equal to said supply voltage level upon redistribution of the wiring capacitances of the transmission lines formed by said bus wires.

31. A bus driving system according to claim 30, wherein said detection circuit includes:

a signal generation circuit for generating an activation signal and a reference voltage from the control signal delivered from either one of said second or third control line and the control signal delivered from said fourth control line; and a latch circuit for regenerating a signal level on the basis of the signals outputted from said signal generation circuit.

32. A bus driving system for transmitting data of n bits (where n is a positive integer), comprising:

(n+4) wires including first to (n+4)-th wires;

at least one set of (n+2) switching circuits including first to (n+2)-th switching circuits;

means for making potentials at said first to (n+3)-th wires coincide with a level of a first operation potential level; and means for making potential at said (n+4)-th wire coincide with a second operation potential level;

wherein a k-th switching circuit (where k is a given integer greater than 1 (one) and smaller than (n+2)) controls conduction and non-conduction between said k-th wire and said (n+4)-th wire;

said first to n-th switching circuits responding to said first to n-th bit signals, respectively; and wherein said first to (n+2)-th switching circuits respond to a first control signal.

33. A bus driving system according to claim 32, wherein said k-th switching circuit includes a n-channel MOSFET having a drain-source path connected between said k-th wire and said (n+4)-th wire.

34. A bus driving system according to claim 32, wherein said k-th switching circuit includes a p-channel MOSFET having a drain-source path connected between said k-th wire and said (n+4)-th wire.

35. A bus driving system according to claim 32, wherein said (n+3)-th wire is disposed adjacent to said (n+1)-th wire and said (n+2)-th wire.

36. A bus driving system according to claim 32, wherein said bus including at least one set of first to n-th amplifier circuits, an i-th amplifier circuit (where i represents a given integer greater than 1 (one) and smaller than n inclusive thereof) includes:

first and second n-channel MOSFETs each having a source terminal connected to a first node and a drain terminal connected to a second node;

third and fourth n-channel MOSFETs each having a source terminal connected to said first node and a drain terminal connected to a third node;

a fifth n-channel MOSFET having a source terminal connected to said second node, a drain terminal connected to a fourth node and a gate terminal connected to a fifth node;

a sixth n-channel MOSFET having a source terminal connected to said third node, a drain terminal connected to said fifth node and a gate terminal connected to said fourth node;

a first p-channel MOSFET having a drain terminal connected to said fourth node, a gate terminal connected to said fifth node and a source terminal connected to a first power source;

a second p-channel MOSFET having a drain terminal connected to said fifth node, a gate terminal connected to said fourth node and a source terminal connected to said first power source;

a switching circuit for controlling conduction and non-conduction between said fourth node and said first power source;

a switching circuit for controlling conduction and non-conduction between said fifth node and said first power source; and a switching circuit for controlling conduction and non-conduction between said first node and a second power source;

wherein the gate terminals of said first and second n-channel MOSFETs are connected to the i-th wire; and wherein one of the gate terminals of said third and fourth n-channel MOSFETs is connected to said (n+1)-th wire while the other gate terminal is connected to said (n+2)-th wire.

37. A driver circuit including a p-channel MOS transistor having a source-drain path connected between a circuit point of a first operation potential level and an output wire, and an n-channel MOS transistor having a source-drain path connected between said output wire and a circuit point of a second operation potential level, wherein gates of said p-channel MOS transistor and said n-channel MOS transistor responds to a data input signal, whereby an output signal relevant to said data input signal is delivered onto said output wire, said driver circuit further comprising:

a parallel connection of a source-drain path of an n-channel MOS switching transistor and a capacitor, said parallel connection being inserted between a source terminal of said n-channel MOS transistor and said circuit point of said second operation potential level; and a control circuit controlled by a precharge signal, an enable signal controlling drive and floating states of said driver circuit and said data input signal, to thereby control the gate of said p-channel MOS transistor and the gate of said n-channel MOS transistor;

wherein the gate of said n-channel MOS switching transistor is controlled by said precharge control signal.

38. A semiconductor integrated circuit which comprises a chip incorporating therein a CPU, a memory, a peripheral circuit and an internal bus, and a driver circuit disposed between said internal bus and at least one of said CPU and said peripheral circuit, said driver circuit including:

a p-channel MOS transistor having a source-drain path connected between a circuit point of a first operation potential level and an output wire;

an n-channel MOS transistor having a source-drain path connected between said output wire, and a circuit point of a second operation potential level;

gates of said p-channel MOS transistor and said n-channel MOS transistor responding to a data input signal, to thereby deliver an output signal relevant to said data input signal onto said output wire;

a parallel connection of a source-drain path of an n-channel MOS switching transistor and a capacitor, said parallel connection being inserted between a source terminal of said n-channel MOS transistor and said circuit point of said second operation potential level; and a control circuit controlled by a precharge signal, an enable signal controlling drive and floating states of said driver circuit and said data input signal, to thereby control the gate of said p-channel MOS transistor and the gate of said n-channel MOS transistor;

wherein the gate of said n-channel MOS switching transistor is controlled by said precharge control signal.

39. A semiconductor integrated circuit according to claim 38, wherein said chip constitutes an application specific integrated circuit (ASIC) incorporating either a single-chip microcomputer or a CPU core.

40. A driver circuit including a p-channel MOS transistor having a source-drain path connected between a circuit point of a first operation potential level and an output wire, and an n-channel MOS transistor having a source-drain path connected between said output wire and a circuit point of a second operation potential level, wherein gates of said p-channel MOS transistor and said n-channel MOS transistor responds to a data input signal, whereby an output signal relevant to said data input signal is delivered onto said output wire, said driver circuit further comprising:

a parallel connection of a source-drain path of an n-channel MOS switching transistor and a capacitor, said parallel connection being inserted between a source terminal of said n-channel MOS transistor and said circuit point of said second operation potential level; and a control circuit controlled by an enable signal controlling drive and floating states of said driver circuit and said data input signal, to thereby control the gate of said p-channel MOS transistor and the gate of said n-channel MOS transistor;

wherein the gate of said n-channel MOS switching transistor is driven by a signal of a phase opposite to that of the signal driving the gate of said n-channel MOS transistor.

41. A semiconductor integrated circuit which comprises a chip incorporating therein a CPU, a memory, a peripheral circuit and an internal bus, and a driver circuit disposed between said internal bus and at least one of said CPU and said peripheral circuit, said driver circuit including:

a p-channel MOS transistor having a source-drain path connected between a circuit point of a first operation potential level and an output wire;

an n-channel MOS transistor having a source-drain path connected between said output wire, and a circuit point of a second operation potential level;

gates of said p-channel MOS transistor and said n-channel MOS transistor responding to a data input signal, to thereby deliver an output signal relevant to said data input signal onto said output wire;

a parallel connection of a source-drain path of an n-channel MOS switching transistor and a capacitor, said parallel connection being inserted between a source terminal of said n-channel MOS transistor and said circuit point of said second operation potential level; and a control circuit controlled by an enable signal controlling drive and floating states of said driver circuit and said data input signal, to thereby control the gate of said p-channel MOS transistor and the gate of said n-channel MOS transistor;

wherein the gate of said n-channel MOS switching transistor is driven by a signal of a phase opposite to that of the signal driving the gate of said n-channel MOS transistor.

42. A semiconductor integrated circuit according to claim 41, wherein said chip constitutes an application specific integrated circuit (ASIC) incorporating either a single-chip microcomputer or a CPU core.

43. An information processing system comprising:

antenna means for transmitting and receiving a radio signal;

a modulator/demodulator circuit for converting said signal supplied from said antenna means;

a digital-to-analog converter for converting said signal into an analog signal;

an analog-to-digital converter for converting said signal into a digital signal;

a memory means for storing information; and an integrated circuit including a plurality of chips mounted on a package board and a bus system for interconnecting said chips, said bus system including a bus driving system comprising:

bus wires wired between a transmitting end and a receiving end for carrying a plurality of data signals and control signals, a driver circuit provided at said transmitting end for driving said bus wires, a control circuit for redistributing wiring capacitances of transmission lines formed by said bus wires, and a detection circuit provided at said receiving end for detecting bus signals.

44. An integrated circuit including a plurality of chips mounted on a package board and a bus system for interconnecting said chips, said bus system including a bus driving system comprising:

bus wires wired between a transmitting end and a receiving end for carrying a plurality of data signals and control signals;

a driver circuit provided at said transmitting end for driving said bus wires;

a control circuit for redistributing wiring capacitances of transmission lines formed by said bus wires; and a detection circuit provided at said receiving end for detecting bus signals.

45. An information processing system comprising:

antenna means for transmitting and receiving a radio signal;

a modulator/demodulator circuit for converting said signal supplied from said antenna means;

a digital-to-analog converter for converting said signal into an analog signal;

an analog-to-digital converter for converting said signal into a digital signal;

a memory means for storing information; and an integrated circuit including a plurality of chips mounted on a package board and a bus system for interconnecting said chips, said bus system including a bus driving system comprising:

bus wires wired between a transmitting end and a receiving end for carrying a plurality of data signals and control signals, a driver circuit for driving said bus wires at said transmitted end, a charge circuit for charging wiring capacitances of transmission lines formed by said bus wires and extending from said transmitting end to said receiving end, control wires for redistributing wiring capacitances of said bus wires, a switch circuit for discharging an electric charge stored in said wiring capacitances of said control wires, and a detection circuit for detecting data signals from said bus wires at said receiving end.

* * * * *